(12) United States Patent
Beckman

(10) Patent No.: US 10,138,140 B2
(45) Date of Patent: Nov. 27, 2018

(54) SYSTEMS AND METHODS FOR CONTINUOUS CONTACTING TUNNEL DESALINATION

(71) Applicant: James Beckman, Tempe, AZ (US)

(72) Inventor: James Beckman, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/825,355

(22) Filed: Nov. 29, 2017

(65) Prior Publication Data

US 2018/0079659 A1   Mar. 22, 2018

Related U.S. Application Data

(63) Continuation of application No. PCT/US2016/037338, filed on Jun. 14, 2016.

(60) Provisional application No. 62/180,814, filed on Jun. 17, 2015.

(51) Int. Cl.
| | |
|---|---|
| *C02F 1/14* | (2006.01) |
| *B01D 1/14* | (2006.01) |
| *B01D 3/34* | (2006.01) |
| *B01D 5/00* | (2006.01) |
| *C02F 103/08* | (2006.01) |

(52) U.S. Cl.
CPC .............. *C02F 1/14* (2013.01); *B01D 1/14* (2013.01); *B01D 3/346* (2013.01); *B01D 5/006* (2013.01); *C02F 2103/08* (2013.01); *Y02A 20/128* (2018.01); *Y02A 20/129* (2018.01); *Y02A 20/142* (2018.01); *Y02A 20/212* (2018.01); *Y02W 10/37* (2015.05)

(58) Field of Classification Search
CPC .................................... C02F 1/14; B01D 1/14
See application file for complete search history.

(56) References Cited

U.S. PATENT DOCUMENTS

| | | | | |
|---|---|---|---|---|
| 5,290,403 | A * | 3/1994 | Saask | B01D 3/346 |
| | | | | 159/DIG. 27 |
| 6,440,275 | B1 | 8/2002 | Domen | |
| 7,431,805 | B2 * | 10/2008 | Beckman | B01D 1/22 |
| | | | | 202/155 |

(Continued)

OTHER PUBLICATIONS

PCT; International Search Report and the Written Opinion of the International Searching Authority dated Nov. 4, 2016 in International Application No. PCT/US2016/037338.

*Primary Examiner* — Jonathan Miller
(74) *Attorney, Agent, or Firm* — Snell & Wilmer L.L.P.

(57) ABSTRACT

An exemplary water treatment unit comprises a horizontal tunnel comprising an inlet, an outlet, and a basin portion disposed below a dewvaporation portion, a center divider disposed in the basin portion so as to create a liquid flow path extending from the inlet to the outlet, a heat transfer wall disposed above the center divider so as to create an air flow path substantially parallel to the liquid flow path and extending from the inlet to the outlet, a first continuous longitudinal pump disposed in the horizontal tunnel and configured to wet the heat transfer wall with liquid disposed in the basin portion, and a heating mechanism configured to increase the temperature of air disposed between the air inlet and the air outlet.

20 Claims, 23 Drawing Sheets

(56) References Cited

U.S. PATENT DOCUMENTS

| | | | |
|---|---|---|---|
| 7,467,523 B2 * | 12/2008 | Vetrovec | B01D 5/0066 |
| | | | 62/272 |
| 2006/0076226 A1 | 4/2006 | Marcellus | |
| 2007/0007120 A1 | 1/2007 | Taylor | |
| 2008/0066874 A1 * | 3/2008 | Bhatti | B01D 1/14 |
| | | | 159/5 |
| 2009/0223803 A1 | 9/2009 | Bhatti | |
| 2010/0147673 A1 | 6/2010 | Passarelli | |
| 2011/0139378 A1 * | 6/2011 | Lakatos | C02F 9/00 |
| | | | 159/4.01 |
| 2013/0168224 A1 * | 7/2013 | Godshall | B01D 1/0035 |
| | | | 203/10 |
| 2015/0047963 A1 * | 2/2015 | Roch | B01D 3/007 |
| | | | 202/185.1 |

\* cited by examiner

SYSTEMS AND METHODS FOR CONTINUOUS CONTACTING TUNNEL DESALINATION

CROSS-REFERENCE TO RELATED APPLICATIONS

This application is a continuation of PCT/US2016/037338 entitled "SYSTEMS AND METHODS FOR CONTINUOUS CONTACTING TUNNEL DESALINATION" filed on Jun. 14, 2016. PCT/US2016/037338 claims priority to, and the benefit of, U.S. Provisional Application No. 62/180,814 entitled "SYSTEMS AND METHODS FOR CONTINUOUS CONTACTING TUNNEL DESALINATION" filed on Jun. 17, 2015. Each of the aforementioned applications is incorporated herein by reference in their entirety for all purposes.

TECHNICAL FIELD

The present disclosure relates to humidification/de-humidification thermal systems and processes, and in particular, to continuous contacting horizontal desalination systems and processes.

BACKGROUND

Many technologies have been used to perform desalination resulting in preferred technologies based on economics. For example, in the desalination of mild brackish water having less than 1000 ppm Total Dissolved Solids ("TDS"), Reverse Osmosis ("RO") is a preferred desalination technology. This is a reflection of the fact that other technologies involve phase change (such as boiling) whereas RO employs low-pressure pumps (less than 100 psia or 7 bar) to force water through semi-permeable membranes resulting in less energy consumption than that involved in a phase change process. However, in purification and/or treatment of waters containing non-filterable suspended particulates, RO is ineffective. For example, water from the Colorado River contains silt in the 1 micron range, which tends to foul RO membranes, thereby increasing the maintenance and/or pre-treatment costs of RO operation. Similarly, chemical-mechanical-planarization slurries containing less than 1 micron silica foul membranes.

For aqueous applications for liquids with higher TDS such as RO concentrates, waste streams, and seawater, other mechanical and thermal technologies economically compete with RO. In the case of seawater desalination, the RO pump pressures increase to 1200 psia, or 80 bar, and feed waters require expensive pre-treatment in order to protect and extend the life of the RO membranes.

Technologies competitive with RO for seawater desalination include Mechanical Vapor Compression ("MVC"), Multi-Stage Flash Distillation ("MSF"), and Multi-Effect Distillation ("MED") with and without Thermal Vapor Compression, among others. The MVC needs shaft power to drive its compressor. The motor can be either electrically or thermally driven. For electrically driven MVC, MVC plants consume more electricity than RO units in the same seawater service. The other processes dominantly use and reuse heat as the main driver to affect temperature-driving force between boiling and condensing at staged pressures. The thermally driven plants attempt to reuse the high temperature applied heat as many times as is economically possible to minimize operating costs. This energy reuse factor economically varies from 6 to 12.

Thermal processes that operate below the boiling point of water are called Humidification/De-Humidification ("HDH"). Certain HDH units require two heat transfer towers (or zones) to transfer heat from a massive flow of water. The water is used as both an internal heat source and internal heat sink. The requirement of two towers makes the HDH process energy inefficient. Accordingly, improved systems and methods for desalination remain desirable.

BRIEF DESCRIPTION OF THE DRAWINGS

With reference to the following description, appended claims, and accompanying drawings as attached:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for desalination and/or device fabrication and testing may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical desalination system.

As disclosed herein, "dewvaporation" refers to a technique for HDH thermal processes that requires only one heat and mass transfer unit, making it more energy efficient. Conventional dewvaporation may be used in the desalination and water reclamation of seawater, brackish water, evaporation pond water, RO plant concentrates, Chemical Mechanical Planarization slurries from the semiconductor industries, volatile organic compounds ("VOCs") such as methyl tertiary butyl ether ("MTBE") and tricholoethylene ("TCE"), contaminant removal from ground water, and other applications.

Figure 1:
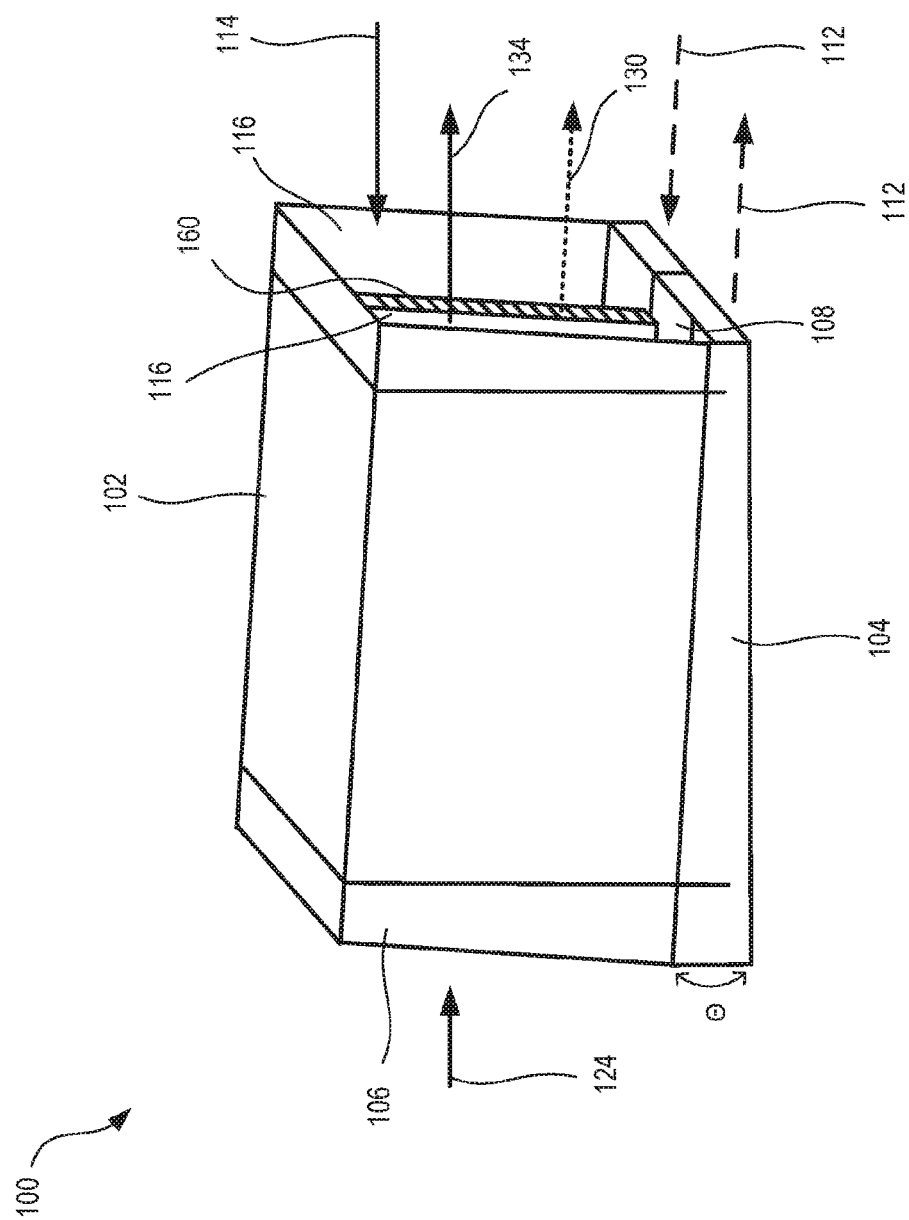
FIG. 1 illustrates a perspective view of a water treatment unit in accordance with various embodiments.

Systems and methods for dewvaporation using continuous contacting tunnel desalination are disclosed herein. With reference to FIG. 1, a water treatment unit 100 is illustrated. Water treatment unit 100 may comprise a horizontal tunnel configured to desalinate water. In various embodiments, water treatment unit 100 heats and/or humidifies air from ambient conditions to about 180° F. In various embodiments, steam or another suitable heat or humidity source adds one degree of heat and humidity to bring air to about 181° F., which then can cool down to about 80° F. In various embodiments, ambient air is heated and humidified by the evaporation of a brine and the follow on condensation (dew formation) of the evaporated water.

Figure 2:
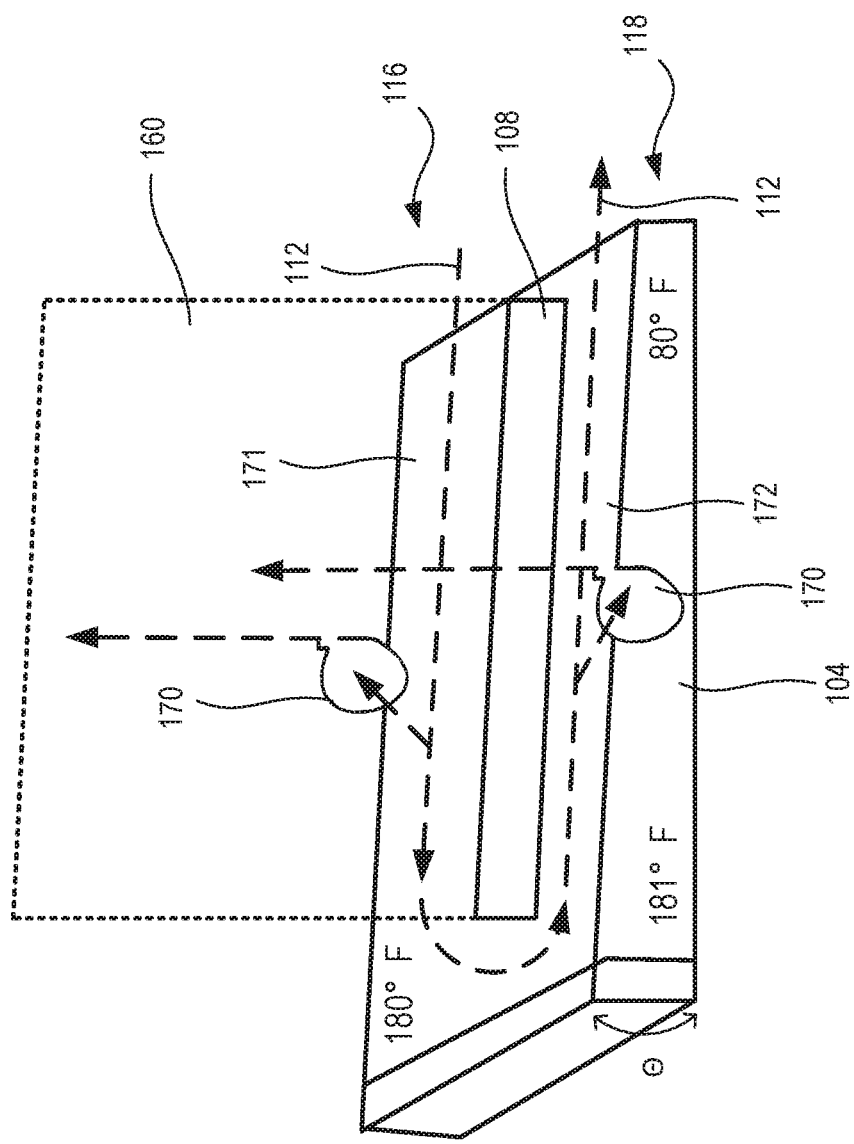
FIG. 2 illustrates a perspective view of portions of a water treatment unit in accordance with various embodiments.

In various embodiments, and with additional reference to FIG. 2, water treatment unit 100 comprises a horizontal tunnel 102 comprising a lower basin portion 104 disposed beneath an upper dewvaporation portion 106. Horizontal tunnel 102 is partially divided by a center divider 108, which comprises a vertical wall disposed so as to create a tunnel-like pathway within horizontal tunnel 102 through which liquid and gas can flow. In various embodiments, center divider 108 comprises a heat transfer wall 160. Water treatment unit 100 further comprises at least one continuous longitudinal pump ("CLP") 170 configured to continuously wet heat transfer wall 160 with brine 112 from basin portion 104.

Figure 3:
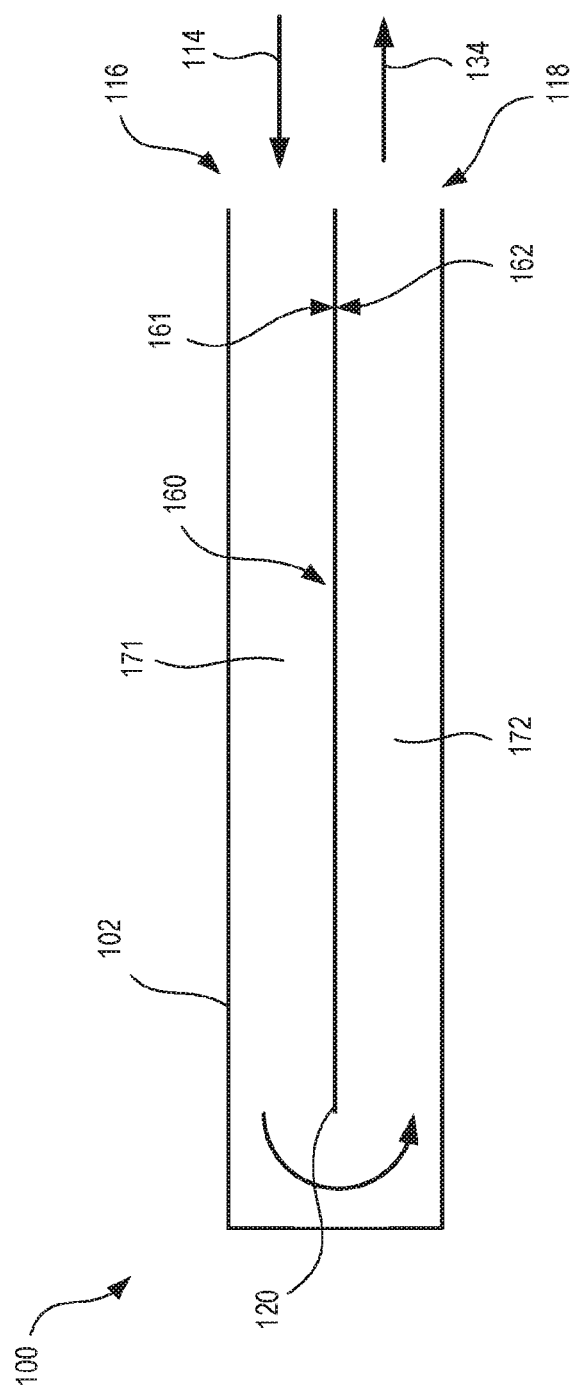
FIG. 3 illustrates a schematic top view of a water treatment unit in accordance with various embodiments.

Various systems and methods disclosed herein comprise a heat-driven process using a vapor-carrying gas 114 that remains at constant pressure throughout the system or method. With reference to FIG. 3, an air flow path of vapor-carrying gas 114 through a water treatment unit 100 is illustrated. In various embodiments, vapor-carrying gas 114 comprises air. However, any suitable vapor-carrying gas may be used. In various embodiments, vapor-carrying gas 114 is brought into a horizontal tunnel 102 on the evaporation side 161 of a heat transfer wall 160. In various embodiments, vapor-carrying gas 114 comprises a wet bulb temperature of about 69.8° F. (21° C.), thereby containing about 0.025 moles of water vapor per mole of air. However, vapor-carrying gas 114 may comprise any suitable wet bulb temperature.

Figure 4:
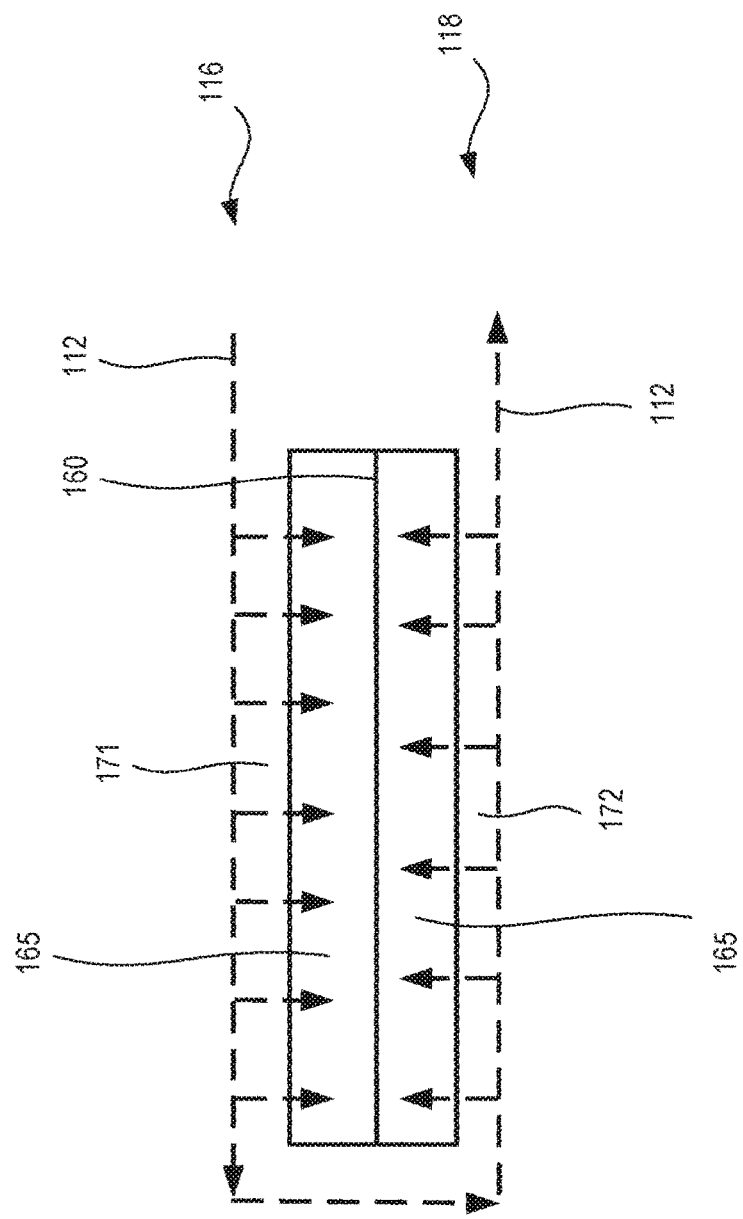
FIG. 4 illustrates a schematic top view of brine flow through a water treatment unit in accordance with various embodiments.
Figure 5:
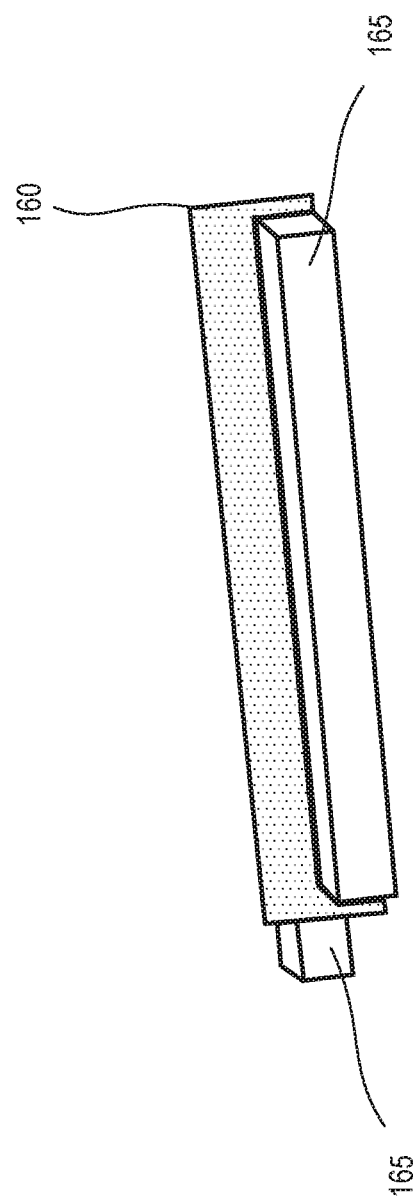
FIG. 5 illustrates a perspective view of portions of a water treatment unit in accordance with various embodiments.

With reference now to FIGS. 2 and 4, a liquid flow path of brine 112 through a water treatment unit 100 is illustrated. Brine 112 may enter a basin portion 104 of the horizontal tunnel 102 at an inlet 116. As brine 112 moves into horizontal tunnel 102, brine 112 is continuously lifted by at least one CLP 170 disposed at least partially in horizontal tunnel 102 and communicated onto a heat transfer wall 160. In various embodiments, the water treatment unit 100 comprises a first CLP 170 disposed in an evaporation area 171 of the water treatment unit 100. In various embodiments, the water treatment unit 100 comprises a second CLP 170 disposed in a dew formation area 172 of the water treatment unit 100. With additional reference to FIG. 5, the CLP 170 may communicate brine 112 vertically upward to one or more sponges 165 disposed at the top of heat transfer wall 160. Brine 112 may be communicated through basin portion 104 from evaporation area 171 to dew formation area 172, exiting horizontal tunnel 102 at outlet 118. In various embodiments, brine 112 becomes more concentrated in salts as it moves through basin portion 104 and finally exits horizontal tunnel 102 in its most concentrated form. To prevent the brine outlet flow from mixing with the brine inlet flow, at least one longitudinal center divider 108 may be disposed between sponges 165 on either side of heat transfer wall 160 and/or in basin portion 104.

In various embodiments and with reference to FIGS. 1-3, brine 112 is fed into the evaporation area 171 of horizontal tunnel 102 in the same zone as the incoming vapor-carrying gas 114. Heat transfer wall 160 can be wetted with the brine 112 by at least one CLP 170 disposed at least partially in horizontal tunnel 102. In various embodiments, the temperature of brine 112 and/or vapor-carrying gas 114 changes as they move from an inlet 116 of horizontal tunnel 102 to an outlet 118 of horizontal tunnel 102. In various embodiments, the CLP 170 is configured to maintain such temperature changes by wetting heat transfer wall 160 with brine 112. In various embodiments, the CLP 170 wets heat transfer wall 160 while minimizing horizontal mixing of portions of brine 112 having different temperatures.

As vapor-carrying gas 114 moves from inlet 116 to outlet 118, heat can be transferred to evaporation side 161 through heat transfer wall 160. In various embodiments, increased temperature of heat transfer wall 160 on evaporative side 161 causes the brine 112 disposed on heat transfer wall 160 by wetting to evaporate. In various embodiments, evaporation of the brine 112 from heat transfer wall 160 on evaporative side 161 causes the vapor-carrying gas 114 disposed in the evaporation area 171 to increase in temperature and/or humidity. In various embodiments, vapor-carrying gas 114 comprises a temperature of about 180° F. (82° C.) and/or a humidity of about 1.0 moles of water vapor per mole of air as it is communicated to an interior end 120 of heat transfer wall 160.

In various embodiments, an external heat source communicates heated gas 124 into horizontal tunnel 102. Heated gas 124 may be communicated into horizontal tunnel 102 at or near interior end 120 of heat transfer wall 160. Heated gas 124 may comprise air and/or any other suitable gas, vapor, fluid or the like. In various embodiments, heated gas 124 comprises steam. In various embodiments, the external heat source comprises low temperature solar (producing temperatures, for example, of about 131° F. or about 55° C.), high temperature solar (producing temperatures, for example, of about 212° F. or about 100° C.), waste heat, and/or combustible fuels (producing temperatures, for example, of about 212° F. or about 100° C.). However, in various embodiments, the external heat source can produce heated gas 124 of any suitable temperature and/or from any suitable source. In various embodiments, the quantity and/or temperature of heated gas 124 communicated into horizontal tunnel 102 comprises the heat needed at the interior end 120 to establish a heat transfer temperature difference between evaporation side 161 of heat transfer wall 160 and a dew formation side 162 of heat transfer wall 160. In various embodiments, the quantity and/or temperature of heated gas 124 communicated into horizontal tunnel 102 comprises the heat needed to establish a temperature off-set between brine 112 and the pure water condensate (discussed below).

In various embodiments, heated gas 124 combines with, and/or diffuses into, vapor-carrying gas 114 to produce hot saturated air. In various embodiments, hot saturated air comprises a temperature of about 185° F. (85° C.) and/or a humidity (V) of about 1.3 moles of water vapor per mole of air as it is communicated from evaporation area 171 of horizontal tunnel 102 to a dew formation area 172 of horizontal tunnel 102. Hot saturated air can be communicated to dew formation side 162 of heat transfer wall 160. Dew formation side 162, being slightly hotter than evaporation side 161, can allow the hot saturated air to cool and transfer condensation heat from dew formation side 162 to evaporation side 161. Finally, pure water condensate 130, cooled saturated air 134, and concentrated brine 112 can leave dew formation area 172 at outlet 118 of horizontal tunnel 102. In various embodiments, cooled saturated air 134 comprises a temperature of about 140° F. (60° C.).

In various embodiments, brine 112 comprises saline feed water. However, brine 112 may comprise any suitable fluid from which water is sought to be reclaimed and/or distilled. VOC removal behaves ideally as the distillation of almost pure, brackish or sea water. In various embodiments, the systems and methods disclosed herein are used for reclamation of evaporation pond waters that are saturated with salts (for example, about 20 wt %). In various embodiments, brine 112 is processed to extinction by recycling concentrated brine 112 back to inlet 116 for further communication through horizontal tunnel 102. In various embodiments, processing brine 112 to extinction results in generation of multiple products including, for example, distillate and/or wet salt solids.

The effect of salt concentration on the energy reuse factor (or gain output ratio), f, is further discussed hereinbelow. Due to the slight desiccant effect of normal salts, the energy reuse factor, f, decreases with increased salt concentrations. In various embodiments, increased salt concentrations suppress vapor pressure of water, reducing the relative humidity of vapor-carrying gas 114. In various embodiments, additional heated air is communicated into the horizontal tunnel 102 to increase relative humidity and/or temperature of the hot saturated air.

In various embodiments, the mathematical definition of the energy reuse factor, f, is the ratio of the energy transferred through the heat transfer wall 160 to the high temperature energy input as shown in Equation 1:

$$f = \frac{V_{dh} - V_{d0}}{V_{dh} - V_{eh}} \quad (1)$$

In various embodiments, the definition of the molar production flux, $P_f$, is the gas traffic times the water vapor decrease of the dew formation side 162 of the wall divided by the wall area as shown in Equation 2:

$$P_f = \frac{G}{A} \cdot (V_{dh} - V_{d0}) \quad (2)$$

In various embodiments, the temperature off-set between brine 112 and the pure water condensate comprises about 10° F. (5.6° C.). The temperature off-set may be generated by an internal feed heat exchanger and/or external feed heat exchanger. In various embodiments, the energy reuse factor, f, is about 16.8. In various embodiments, the energy reuse factor, f, is about 13 including the heat needed for the temperature off-set. In various embodiments, the product of the energy reuse factor and the molar production flux, $P_f$, is a constant at parametric $V_{eh}$. The value of the constant is a function of the operating variables as shown in the following equations.

In various embodiments, the amount of water vapor contained in the vapor-carrying gas 114 is calculated by specifying the temperature, T, and calculating the vapor pressure, $P_w$, from Equation 3:

$$\ln P_w = B - \frac{\lambda_0}{R \cdot T} \quad (3)$$

where B and $\lambda_0$ are constants obtained by fitting a straight line to the $\ln(P_w)$ versus 1/T for the steam table. For temperature range of 32-212° F. (0-100° C.), B is 14 and $\lambda_0/R$ is 5209 K. The vapor content (moles of water vapor per mole of air) of the vapor-carrying gas 114 is shown by the following Equation 4:

$$V = \frac{RH \cdot P_w}{P - RH \cdot P_w} \quad (4)$$

where the relative humidity ("RH") is given as a function of salinity, S grams salt/liter, by the following Equation 5:

$$RH = 1 - 0.000538 \cdot S \quad (5)$$

In various embodiments, the hottest temperature in the evaporation area is specified, allowing the calculation of the largest value of the $V_{eh}$ in the evaporating section of the unit. Then the change in vapor content of the vapor-carrying gas 114 is specified across the top of the tower by the following Equation 6:

$$\Delta V = V_{dh} - V_{eh} \quad (6)$$

From these specifications, the temperature difference across the heat transfer wall 160 at any position can be described by the following Equation 7:

$$\frac{1}{\Delta T_{LM}|_z} = \left[\frac{B^2 \cdot R}{\lambda_0}\right] \cdot \left[\frac{(1 + \Delta V + V_e|_z) \cdot V_e|_z}{\Delta V}\right] \quad (7)$$

In this process, both the film heat and mass transfer coefficients establish the overall effective heat transfer coefficient, U. In various embodiments, for simultaneous heat and mass transfer operations involving air and water, the Lewis Number is essentially unity, allowing the coefficients to be related by similitude as $k_y = h_g/c_p$. In various embodiments, the effect of the latent energy associated with the mass transfer of water vapor is related to the sensible heat transfer associated with the air/vapor mixture by Equations 8 and 9:

$$h_f|_z = h_g|_z \cdot (1+M|_z) \tag{8}$$

where M is expressed as:

$$M = \left(\frac{\lambda_0}{RT}\right)^2 \cdot \left(\frac{R}{c_p}\right) \cdot V \tag{9}$$

Taking into account both gas film heat transfer coefficients and the thermal resistance of the heat transfer wall 160, then the overall effective heat transfer coefficient, U, can be expressed by Equation 10:

$$\frac{1}{U|_z} = \frac{1}{h_{fe}|_z} + \frac{1}{h_{fd}|_z} + \frac{t}{k} \tag{10}$$

In various embodiments, the heat transferred through the heat transfer wall 160 is essentially the latent heat, □, at the system temperature needed to evaporate water, and can be expressed by Equation 11:

$$q|_z = G \cdot \lambda \cdot (V_e|_{z+\Delta z} - V_e|_z) \tag{11}$$

In various embodiments, the area needed for the heat transfer wall 160 is obtained by an energy balance, as shown by Equation 12:

$$\frac{A|_z}{q|_z} = \frac{1}{U|_z} \times \frac{1}{\Delta T_{LM}|_z} \tag{12}$$

where $$\Delta T_{LM} = T_{yd} - T_{ye} \tag{13}$$

Upon integrating with respect to the overall area and assuming that t/k is small compared to the gas phase resistance, Equation 14 may relate the total energy reuse factor, f, and the total production flux, $P_f$, as follows:

$$f \cdot P_f = \left\{ \left[\frac{\lambda_0}{B \cdot R \cdot T}\right]^2 \cdot \left[\frac{h_g}{C_p}\right] \right\} \cdot \left(\frac{V_{eh}}{2+V_{eh}}\right) \cdot \left(\frac{\lambda_0}{\lambda}\right) \cdot (18) \cdot F_{RH} \tag{14}$$

where the detrimental effect, $F_{RH}$, of reduced relative humidity at the tower top exiting evaporation air stream, RH, is shown by Equation 15:

$$F_{RH} = 1 - (1-RH) \cdot (1+f) \cdot (1+V_{eh}) \tag{15}$$

Equation 14 shows that as the temperature increases in various embodiments, the product of energy reuse factor and molar production flux become greater. It is also apparent that the energy reuse factor, f, and the molar production flux, $P_f$, may be related hyperbolically in an established unit. In various embodiments, the detrimental effect of salt concentration is also included in this expression from Equation 15.

Additionally, in various embodiments, higher values of $V_{eh}$, i.e. higher temperatures, improve both f and $P_f$ values, which is economically beneficial. However, in various embodiments, higher temperatures are limited to the heat source temperature and the normal boiling point of water.

On the other hand, in various embodiments, Equation 18 results by taking into account the heat conduction resistance in the plastic heat transfer wall 160 and the resistances due to the two liquid films on the wall:

$$P_f \cdot f = \left(\frac{\lambda_0}{B \cdot R \cdot T}\right)^2 \cdot \left(\frac{h_g}{c_p}\right) \cdot \left(\frac{V_{eh}}{2+V_{eh}}\right) \cdot \left(\frac{\lambda_0}{\lambda}\right) \cdot F \tag{18}$$

This expression resembles Equation 14, but with an additional term F,

With: $F = \dfrac{1}{1 + F_{RH} + F_g + F_{RH} \cdot F_g \cdot \left(\dfrac{6+3 \cdot V_{eh}}{3+2 \cdot V_{eh}}\right)}$ containing all of the plastic and liquid films resistances to heat transfer.

Rearranging these equations into a form that would be linear in a data plot gives:

$$\underbrace{\frac{\left(\frac{\lambda_0}{\lambda}\right)}{(3+2 \cdot V_{eh})P_f \cdot f} = \left[\left(\frac{c_p}{h_g}\right)\right] \cdot \left(\frac{2+V_{eh}}{3 \cdot V_{eh} + 2 \cdot V_{eh}^2}\right)}_{\text{Air Boundary Layer}} + \underbrace{\frac{B^2 \cdot R}{6} \cdot \sum \frac{t}{k}}_{\text{Wall \& Liquids}}$$

In various embodiments, Equation 18 is used to determine the effective heat transfer area from the data obtained per run. All of the parameters on the right hand side of Equation 18 are known. Data from each run contain the temperature at the top of the horizontal tunnel, production rate and energy consumed. From the horizontal tunnel top temperature, the water vapor to air ratio and energy reuse ratio can be calculated. Therefore, the production density can be assessed on the left hand side of Equation 18. Since the production rate is data, then the effective heat transfer area in the horizontal tunnel 102 can be identified. The effective heat transfer area is a property of the horizontal tunnel 102 design.

Figure 6:
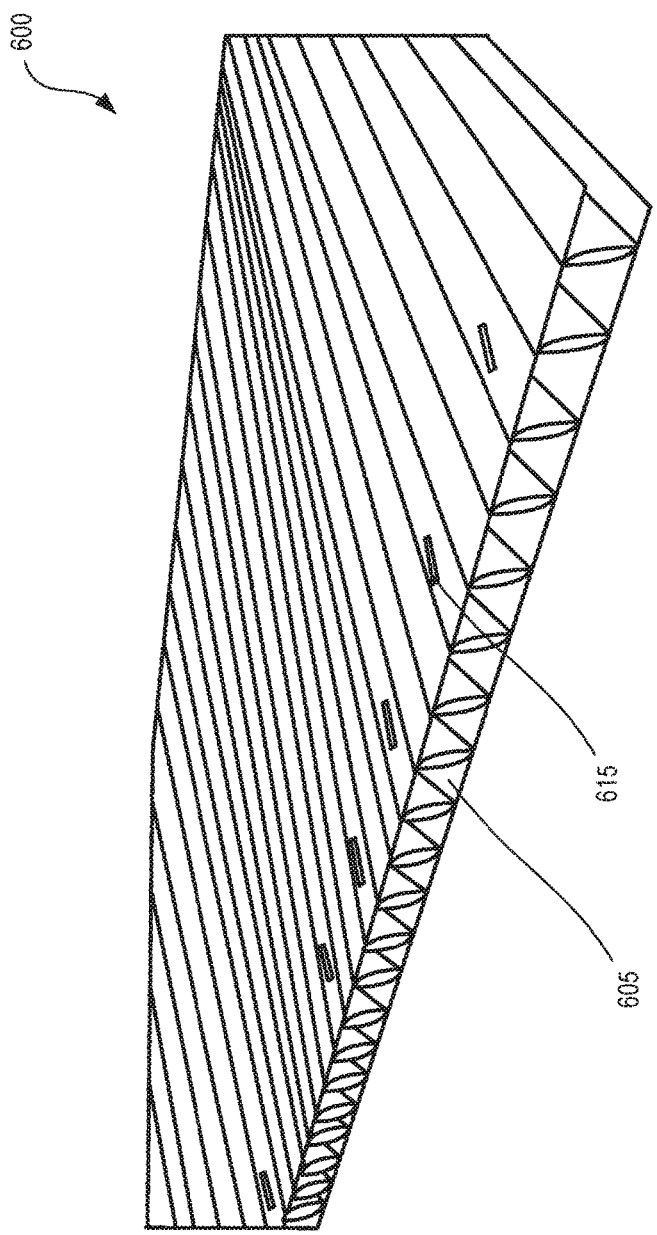
FIG. 6 illustrates an edge-on view of a heat transfer wall in accordance with various embodiments.

In exemplary embodiments and with reference now to FIG. 6, heat transfer wall 600 comprises two substantially parallel planes with a plurality of horizontal chambers extending there between. In various embodiments, heat transfer wall 600 is constructed of twin-wall extruded polypropylene. In further embodiments, heat transfer wall 600 is constructed of polystyrene, polyvinyl chloride, and/or any other suitable plastic. In various embodiments, plastic heat transfer walls 600 constructed of twin-wall extruded plastics offer low cost economics, dimensional stability, free flow zones, manufacturability and commercial availability. However, heat transfer wall 600 may comprise any material and/or construction suitable for use in a water treatment unit 100. In various embodiments, heat transfer wall 600 comprises a thickness of between about 2 mm and about 10 mm. However, heat transfer wall 600 may comprise any suitable thickness. In various embodiments, heat transfer wall 600 comprises a horizontal length of about 4 feet and/or a vertical height of about 2 feet. However, heat transfer wall 600 may be cut to any suitable and/or desired size.

Figure 7:
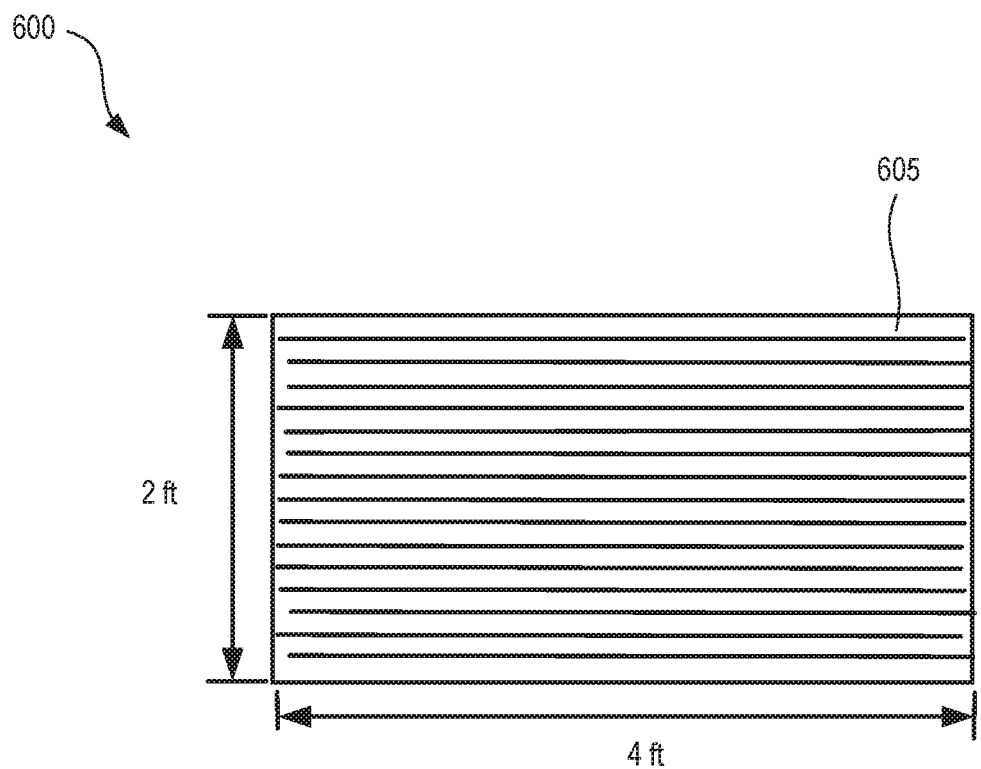
FIG. 7 illustrates a side view of a heat transfer wall in accordance with various embodiments.

FIG. 6 shows an edge-on view of heat transfer wall 600 comprising a twin-wall extruded plastic sheet. With additional reference to FIG. 7, heat transfer wall 600 may comprise the internal flutes and/or horizontal chambers 605 which are disposed in a generally horizontal direction. In various embodiments, horizontal chambers 605 allow condensation to occur isolated from brine 112 passing through the water treatment unit. Condensate 130 collecting in horizontal chambers 605 may be communicated to a condensate channel disposed in heat transfer wall 600 and extending towards outlet 118 of water treatment unit 100 (with momentary reference to FIG. 1). In various embodiments, and with brief reference to FIGS. 1 and 2, heat transfer wall 160 may be disposed in water treatment unit 100 at an angle theta (θ) such that condensate 130 collecting in horizontal chambers 605 may be fed by gravity in a direction from interior end 120 of heat transfer wall 160 towards outlet 118.

Figure 8:
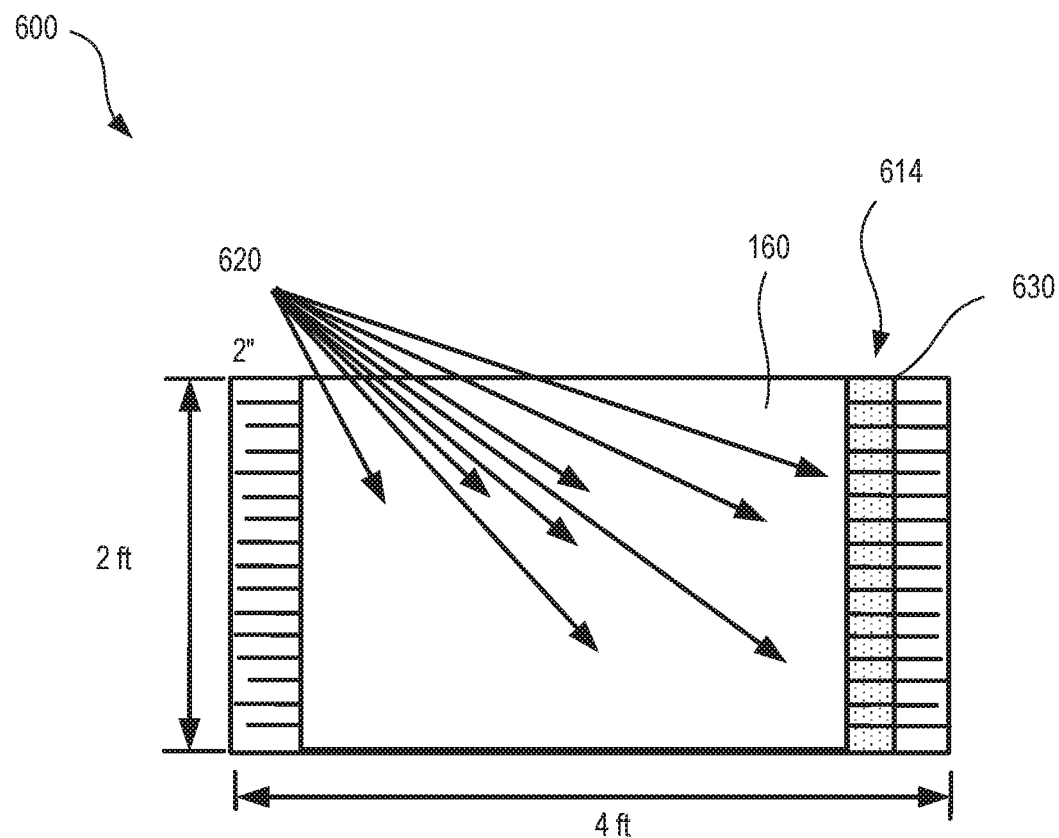
FIG. 8 illustrates a side view of a heat transfer wall in accordance with various embodiments.
Figure 9:
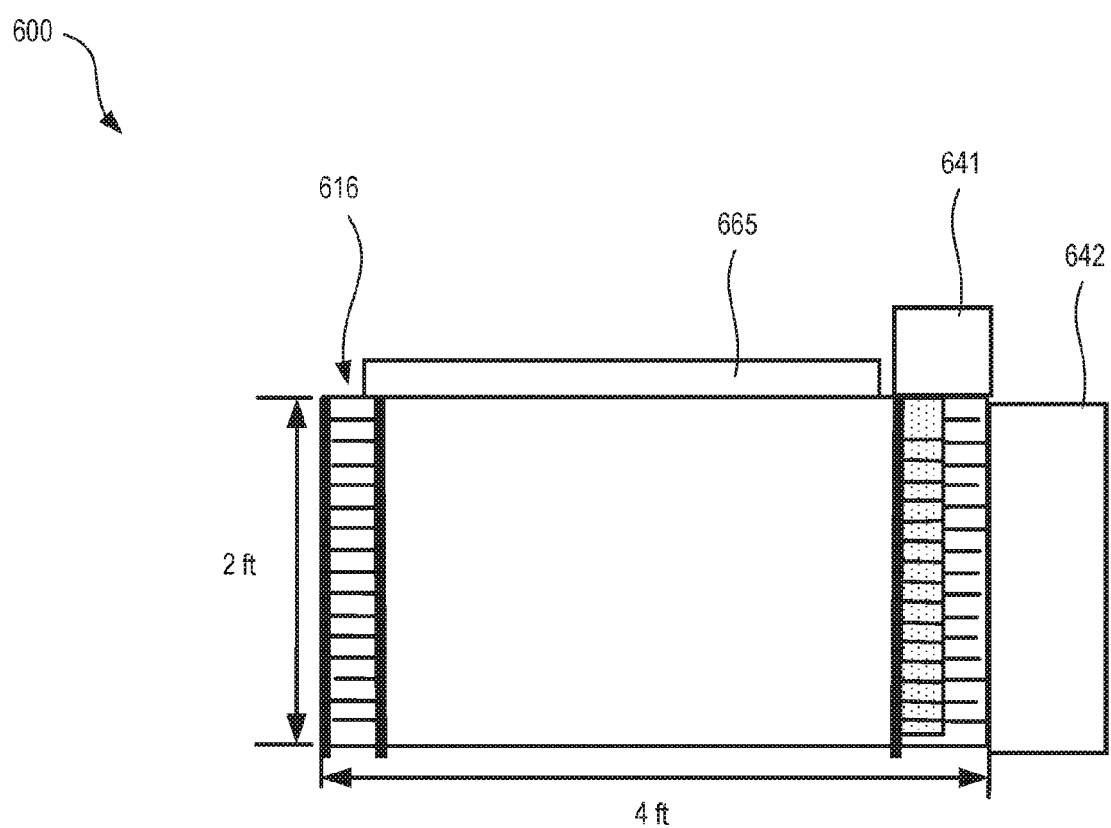
FIG. 9 illustrates schematic views of an exemplary continuous longitudinal pump in accordance with various embodiments.

In various embodiments and with additional reference to FIGS. 8 and 9, the outer surfaces of heat transfer wall 600 are covered with wetting gauze so that the surfaces can wet with brine 112. In various embodiments, wetting gauze comprises Du Pont Anti-Paint Splatter sheet and can be attached by spray adhesive. However, wetting gauze may comprise any material suitable for wetting of heat transfer wall 600. Portions of heat transfer wall 600 covered with wetting gauze may comprise the primary heat transfer area where a water wetting material, for example wetting gauze, is attached. In general, any suitable hydrophilic material that is capable of forming a thin wetted surface on heat transfer wall 160 may be utilized.

In various embodiments, heat transfer wall 600 comprises an ambient air entrance zone 614, which allows vapor-carrying gas 114 to enter the water treatment unit 100 and evenly distribute gas flow. In various embodiments, a vapor removal zone 616 allows any water mist picked up by the air stream to be communicated to horizontal chambers 605 prior to the air leaving the evaporative side of the heat transfer wall 600. In various embodiments, dead zone open cell foam strips 615 may be disposed in vapor removal zone 616 to facilitate water mist removal. Foam strips 615 may comprise an open cell structure that allows air to pass through but captures saline water droplets and mists. Foam strips 615 are operative to prevent saline contamination of the pure condensate that forms on the condensation side of a heat transfer wall. In various embodiments, heat transfer wall 600 further comprises one or more air directional vane inserts 630, which encourage even distribution of ambient air or vapor-carrying gas entering the water treatment unit 100 in the horizontal direction. In various embodiments, heat transfer wall 600 further comprises wall spacers 620 attached to gauze zone to aid in maintaining a gap between walls for air flow. Wall spacers 620 are operative to prevent parallel heat transfer walls from touching; if the evaporation side walls touch, the area of touching will not function as a heat transfer wall because air cannot flow past the touching area, thus reducing the capacity of the tunnel desalination unit. Wall spacers 620 may comprise reticulated foam (sponge-like plastic webbing having about 98% void spacing), small cut pieces of the same material comprising the heat transfer walls, small plastic blocks, and/or the like. Wall spacers 620 are disposed on the evaporative side of a heat transfer wall in a pattern such that wetting gauze 610 covered heat transfer walls do not touch one another. In various embodiments, heat transfer wall 600 further comprises one or more sponges 665 disposed at the top of heat transfer wall 600. In various embodiments, sponges 665 improve water distribution to the wetted heat transfer walls. In various embodiments, heat transfer wall 600 further comprises an air inlet plenum box 641 and an outlet air plenum box 642. Exiting with the exit air is the produced pure water condensate flow stream.

Figure 10:
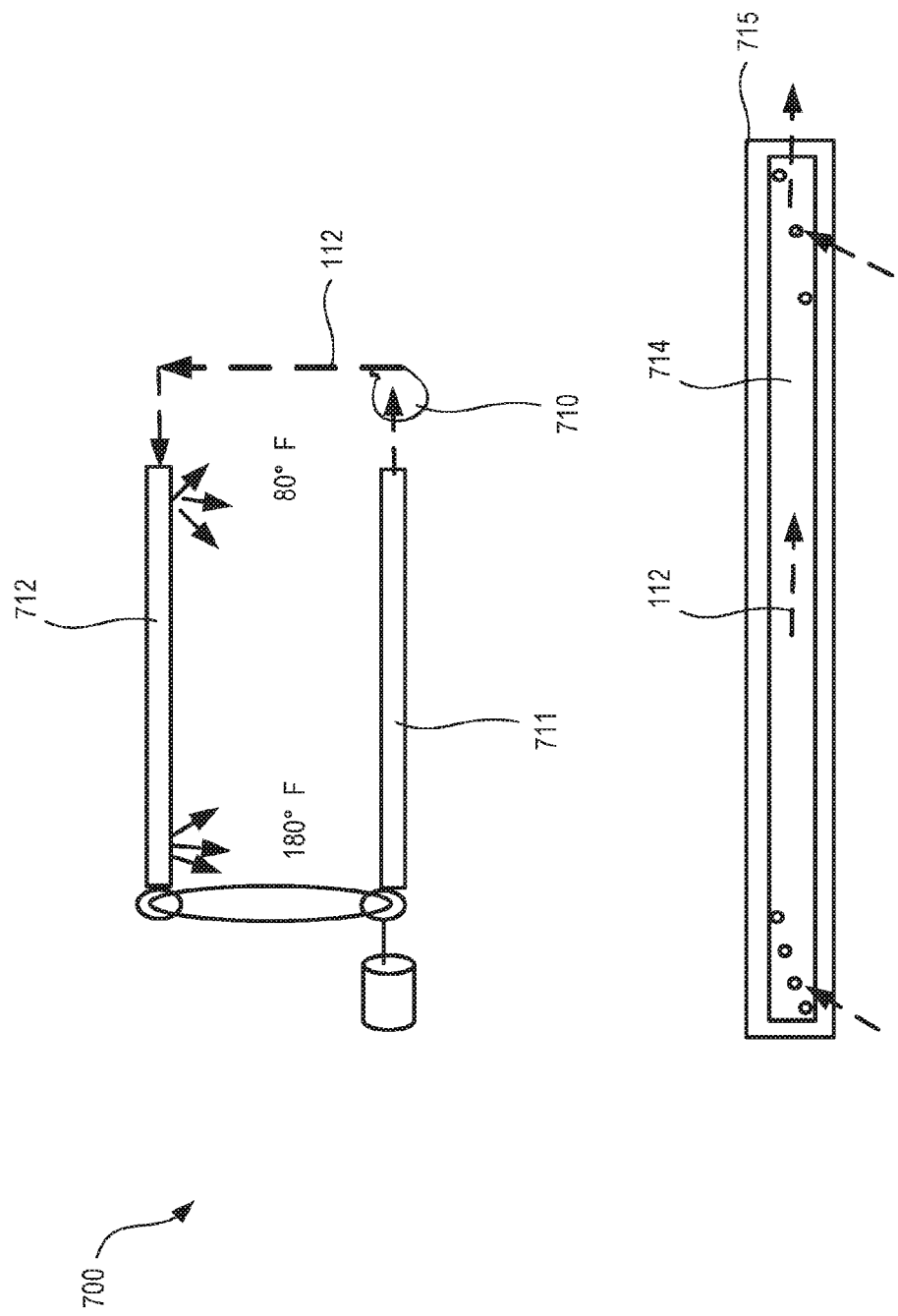
FIG. 10 illustrates a schematic view of an exemplary continuous longitudinal pump in accordance with various embodiments.

In various embodiments, the CLP comprises various designs configured to communicate brine 112 from the basin portion of a water treatment unit 100 to the top of the heat transfer wall in a generally vertical direction. With reference to FIG. 10, in various embodiments, CLP 700 comprises a lower double pipe assembly 711 disposed below an upper double pipe assembly 712. Lower double pipe assembly 711 and the upper double pipe assembly 712 may be disposed in a generally horizontal direction and may be disposed generally parallel to one another, with the lower double pipe assembly 711 being disposed in the basin portion of a water treatment unit 100 such that it is in fluid communication with brine 112. Each of the lower double pipe assembly 711 and the upper double pipe assembly 712 may comprise an outer pipe 713 and an inner rotating pipe 714. As inner rotating pipe 714 rotates, various holes 715 disposed in inner rotating pipe 714 may align with various holes 715 disposed in outer pipe 715, allowing liquid from the basin portion cold end to be pumped to the same cold end in the upper spray zone. Liquid so delivered may flow down the heat transfer wall in the cold zone (thereby wetting the wall), and returning to the same horizontal location in the cold end of the basin portion. Rotation may continuously move the basin liquid selection from cold to the hot end of the basin portion so that the cold remains cold and the hot end remains hot as the walls are wetted.

Figure 11:
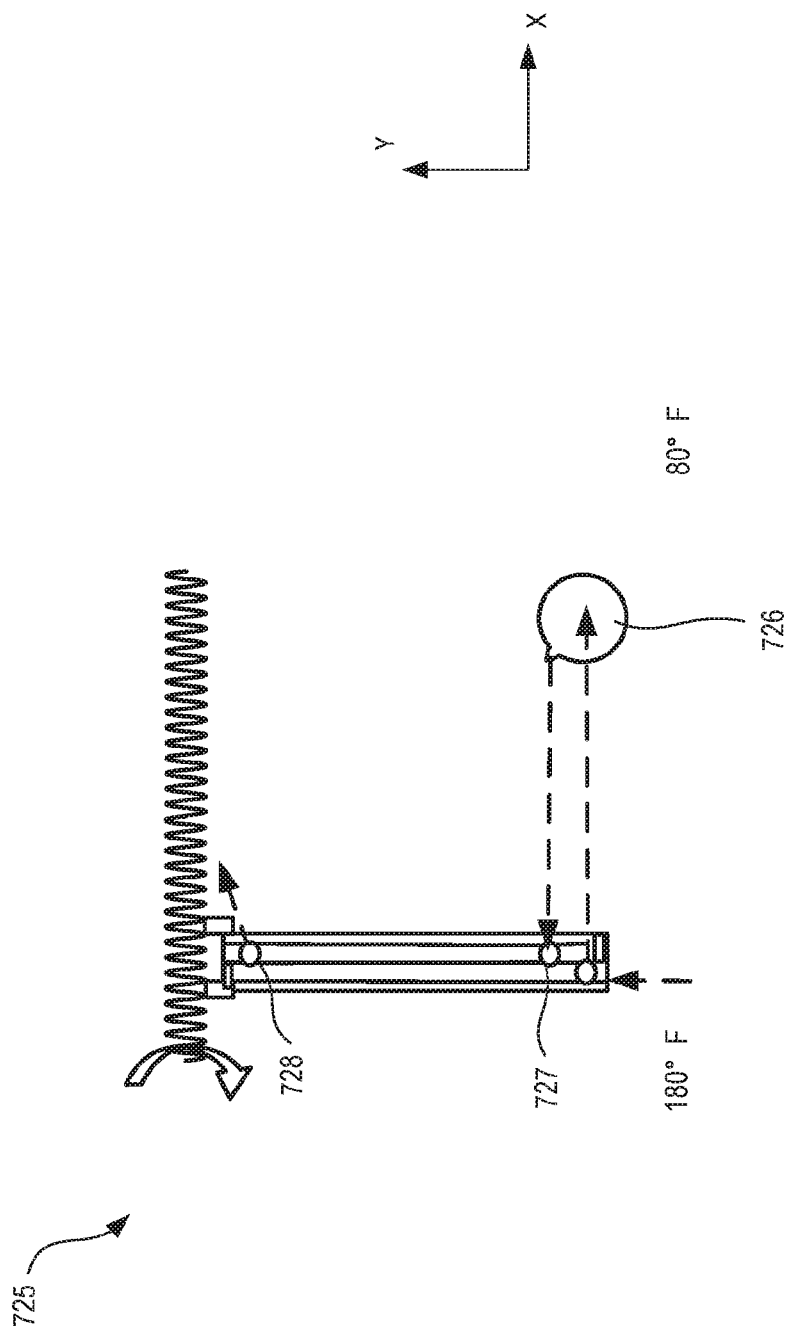
FIG. 11 illustrates a schematic view of an exemplary continuous longitudinal pump in accordance with various embodiments.

With reference now to FIG. 11, in various embodiments, CLP 725 may comprise a single standard pump 726. In this concept standard pump 726 may comprise a fixed location while suction ports 727 and delivery ports 728 may move horizontally in the X-direction from cold to hot ends of the basin portion continuously delivering cold liquid to cold wall zones and hot liquid to hot wall zones.

Figure 12:
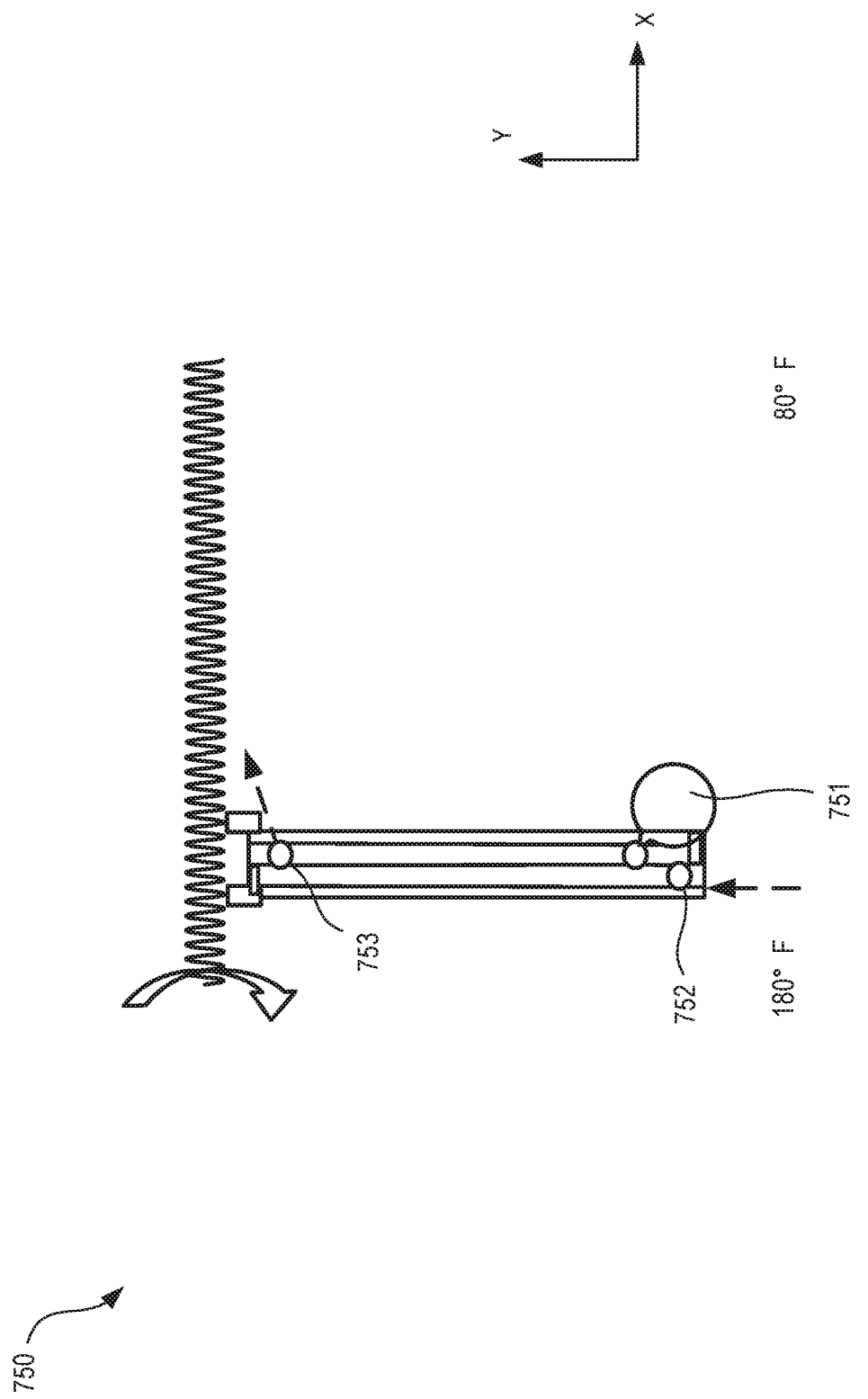
FIG. 12 illustrates a schematic view of an exemplary continuous longitudinal pump in accordance with various embodiments.

With reference to FIG. 12, in various embodiments, CLP 750 may comprise a single pump 751. In this concept, the pump may attach to, and move with, suction ports 752 and delivery ports 753 of the basin portion. The suction ports 752 and delivery ports 753 may move horizontally in the X-direction from cold to hot ends of the basin portion continuously delivering cold liquid to cold walls and hot liquid to hot wall zones.

Figure 13:
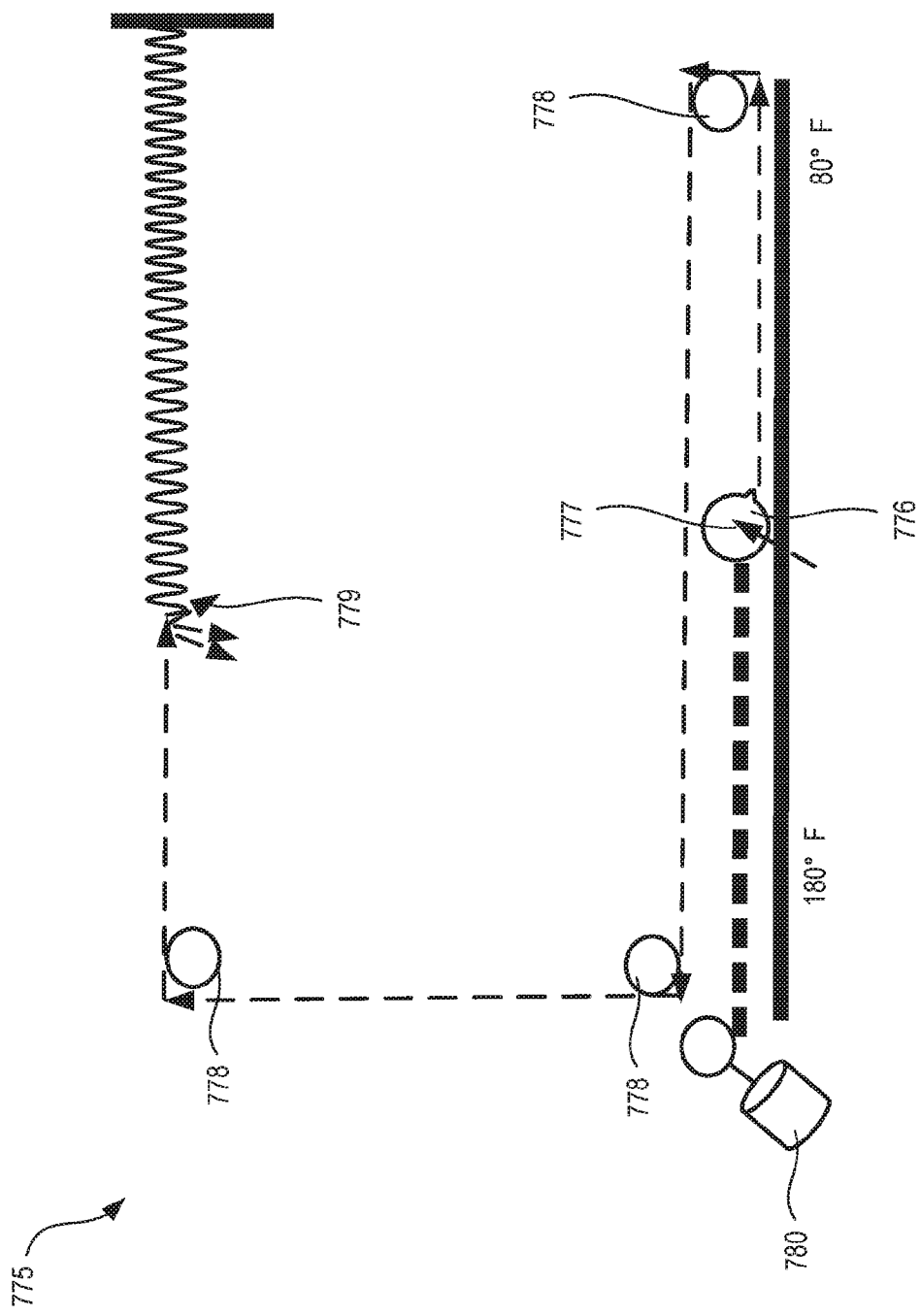
FIG. 13 illustrates a schematic view of an exemplary continuous longitudinal pump in accordance with various embodiments.

With reference to FIG. 13, in various embodiments, CLP 775 may comprise a standard pump 776 that is mobile with a suction port 777. CLP 775 may comprise a set of pulleys 778 that guide a delivery port 779 so that suction port 777 and delivery port 779 move in sync. This arrangement may allow cold basin liquid to be delivered to the cold zone of the wall and hot liquid to be delivered to the hot zone of the wall. CLP 775 may further comprise a motor 780 that rotates clockwise and switches to counterclockwise, driving the pumping system horizontally.

Figure 14:
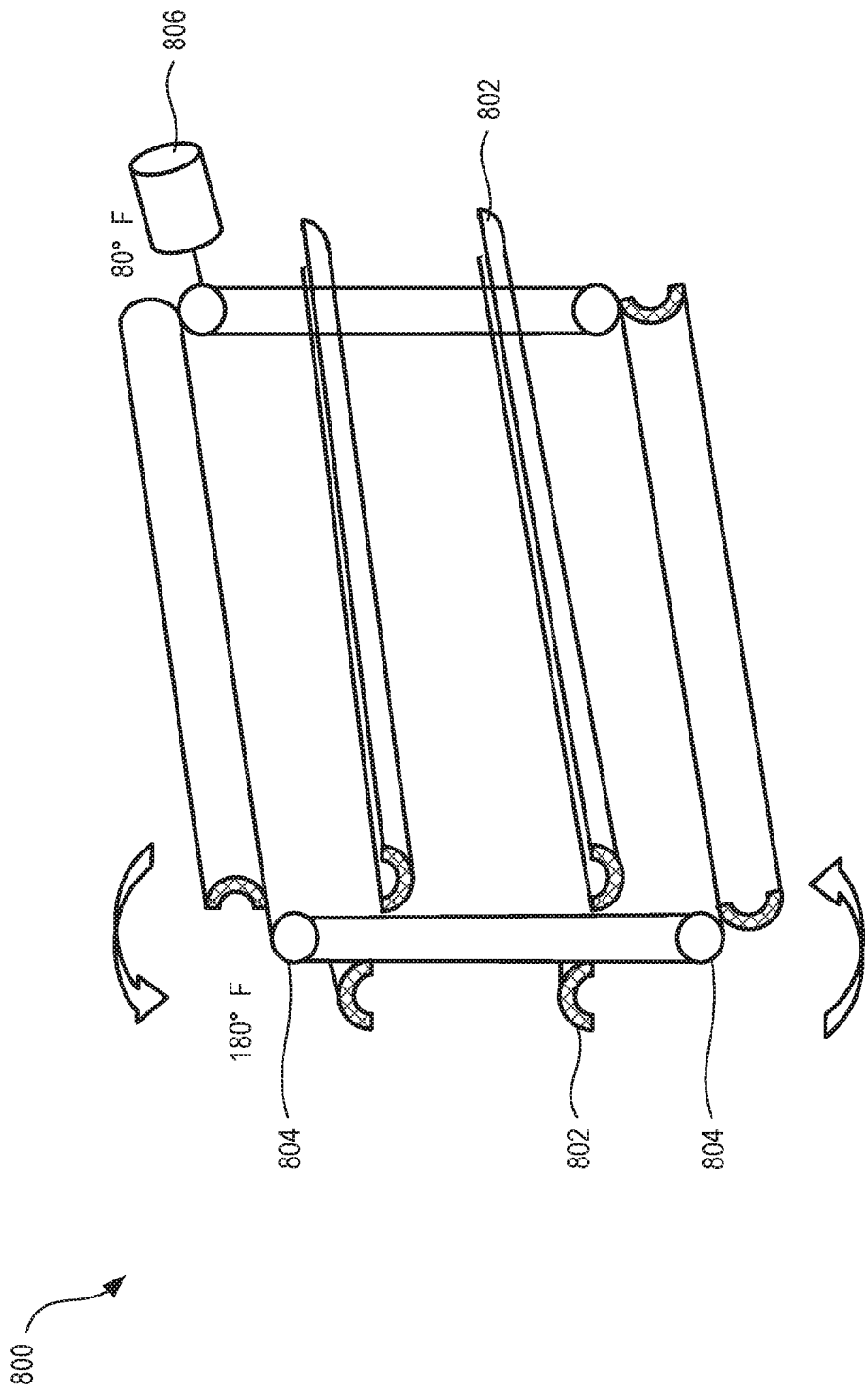
FIG. 14 illustrates a schematic view of an exemplary continuous longitudinal pump in accordance with various embodiments.

With reference to FIG. 14, in various embodiments, CLP 800 may be configured to continuously lift brine 112 to the top of the heat transfer wall in such a way as to preserve the temperature gradient from cold to hot. CLP 800 may comprise a set of scoop trays 802 that are lifted by two pulleys 804 using a gear motor 806. Scoop trays 802 may be lifted at speeds of about 1 rpm in various embodiments.

Figure 15:
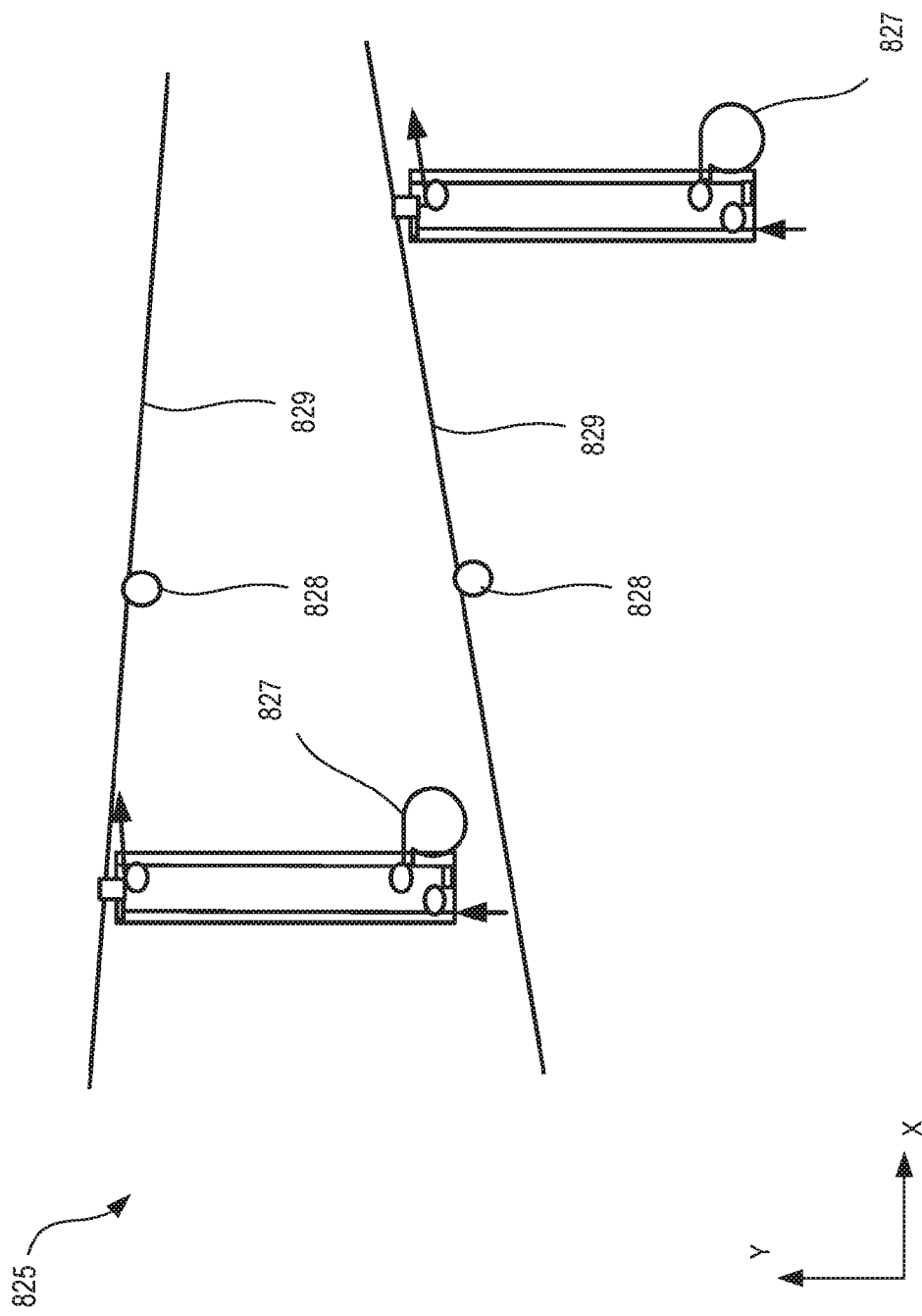
FIG. 15 illustrates a schematic view of an exemplary continuous longitudinal pump in accordance with various embodiments.

With reference to FIG. 15, in various embodiments, CLP 825 may be movable in a longitudinal manner. CLP 825 comprises a teeter-totter in which a single standard pump 827 moves horizontally along the X-axis from the cold zone to the hot zone of the basin portion to continuously pump basin liquids to the top of the wetted wall while preserving the temperature basin profile from cold to hot. CLP 825 may comprise a motor 828 that oscillates the pump suspension bars 829 from left to right. Pump suspension bars 829 may oscillate with a frequency of about 1 cycle per minute. In this manner, the teeter-totter action of the pump suspension bars 829 moving up and down utilizes gravity to allow the standard pump 827 to travel to and fro in a longitudinal manner throughout the basin and thus wet the evaporation wall with saline solution.

Figure 16:
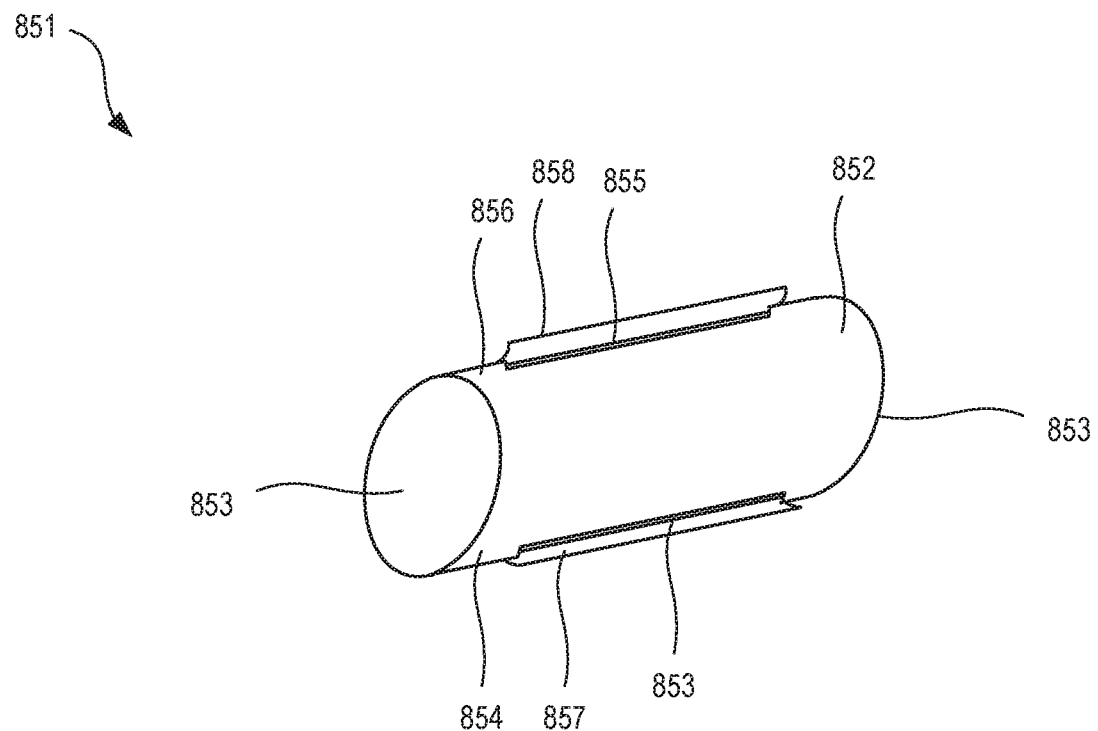
FIG. 16 illustrates a perspective view of a pumping chamber in accordance with various embodiments.
Figure 17:
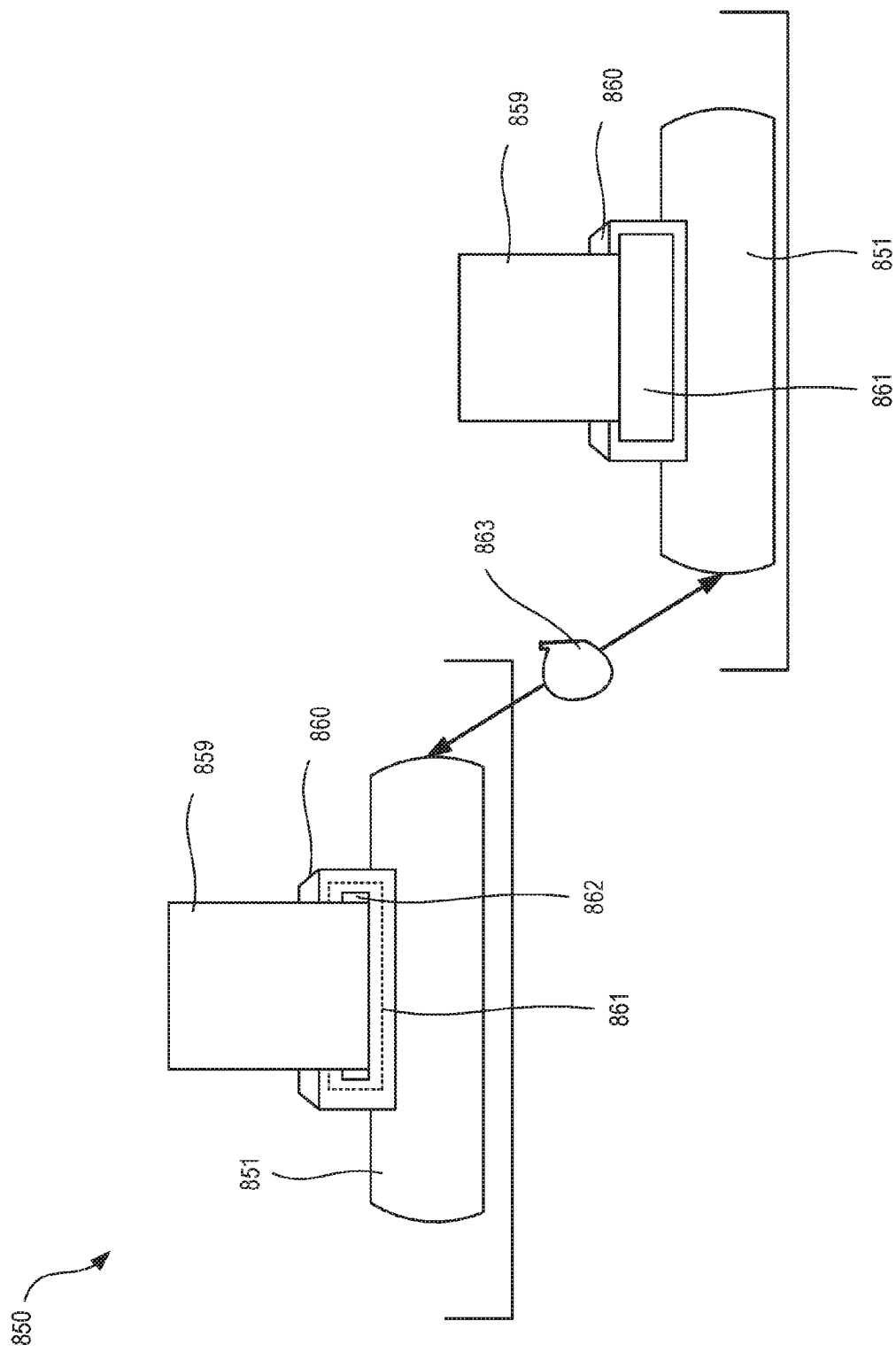
FIG. 17 illustrates a schematic view of an exemplary continuous longitudinal pump in accordance with various embodiments.

CLP philosophy focuses on lifting basin liquid to a higher platform vertically while minimizing longitudinal mixing. In the case of desalination, cooler dilute saline water will not mix with hotter more concentrated saline solutions. An exemplary design comprises a pipe/flapper concept as shown in FIGS. 16-17. In various embodiments, CLP 850 may comprise an oscillating pressure chamber configured to function by the oscillation of pressures inside a pumping chamber 851. Pumping chamber 851 may comprise a pipe 852 with end caps 853 disposed on opposite open ends of pipe 852 to create a generally enclosed chamber. In various embodiments, pumping chamber 851 is about 3 inches in diameter and 2 feet in length. However, CLP 850 may comprise a pumping chamber 851 of any suitable dimensions and/or shape. Pumping chamber 851 may comprise various horizontal slots and sealing flappers disposed in the outer diameter of the pipe 852 in such a way that the basin liquid is brought into the pipe 852 and pushed out of the pipe 852 into a riser sheet 859 to the top of the wall to be wetted by the basin liquids in such a manner so as to sustain the temperature profile. In various embodiments, a first horizontal slot 853 may be disposed in a lower surface 854 of pipe 852 and a second horizontal slot 855 may be disposed in an upper surface 856 of pipe 852.

In various embodiments, CLP 850 comprises two plastic elastic sealing flappers; however, sealing flappers may comprise any suitable material. In various embodiments, a first sealing flapper 857 is disposed on an inner surface of pipe 852 such that upward pressure on pipe 852 at the first horizontal slot 853 and/or on the first sealing flapper 857 causes the flapper to open inwardly, allowing brine 112 to flow into pipe 852. In various embodiments, a second sealing flapper 858 is disposed on an outer surface of pipe 852 such that upward pressure on pipe 852 at the second horizontal slot 855 and/or on the second sealing flapper 858 causes the flapper to open outwardly, allowing brine 112 to flow out of pipe 852. Stated differently, the first sealing flapper may allow water to enter the pipe but prevent water from leaving the pipe. The first sealing flapper opens when liquid is removed from the pipe allowing basin liquid to enter the pipe in its local. When the removed liquid flows back into the pipe, the first sealing flapper closes and the second sealing flapper opens allowing liquid to enter the top housing (described below). This cycle repeats as needed for wall wetting.

CLP 850 may further comprise a top housing 860, a riser sheet 859, and a riser sheet cut-out cover 861. In various embodiments, top housing 860 is disposed on pipe 852 so as to create a chamber into which brine 112 may flow through the second horizontal slot 855 from pipe 852. Top housing 860 may have an open side window 862 for water flow to riser sheet 859. The open window 862 also allows internal sealing of the top housing 860 to pipe 852. Riser sheet 859 can be attached to the open window 862 of top housing 860.

Water may flow out of top housing 860 through the side window 862 and into riser sheet 859. In various embodiments, riser sheet 859 is operatively coupled to top housing 860 and/or partially disposed in top housing 860. Riser sheet 859 may bring water from top housing 860 to the top of a heat transfer wall. In various embodiments, riser sheet 859 comprises a twin wall extruded polypropylene sheet. In various embodiments, riser sheet 859 is approximately 2 millimeters in thickness. However, riser sheet 859 may comprise any shape and/or material suitable for user in a CLP. In various embodiments, riser sheet cut-out cover 861 is coupled to top housing 860 and/or riser sheet 859 so as to close and/or seal the connection between top housing 860 and riser sheet 859. Riser sheet cut-out cover 861 can prevent water from leaking out of riser sheet 859.

In various embodiments, a water treatment unit 100 comprises two pumping chambers 851 connected by an oscillating pump 863. With momentary reference to FIG. 3, a first pumping chamber may be disposed in the evaporative area of water treatment unit 100 and a second pumping chamber may be disposed in the dew formation area of water treatment unit 100. Oscillating pump 863 may be configured to alternately pump brine 112 into the first pumping chamber and second pumping chamber, thereby alternately wetting evaporation side 161 and dew formation side 162 of heat transfer wall 160. The pipe comprises an inner flapper seal and an outer flapper seal.

Figure 18:
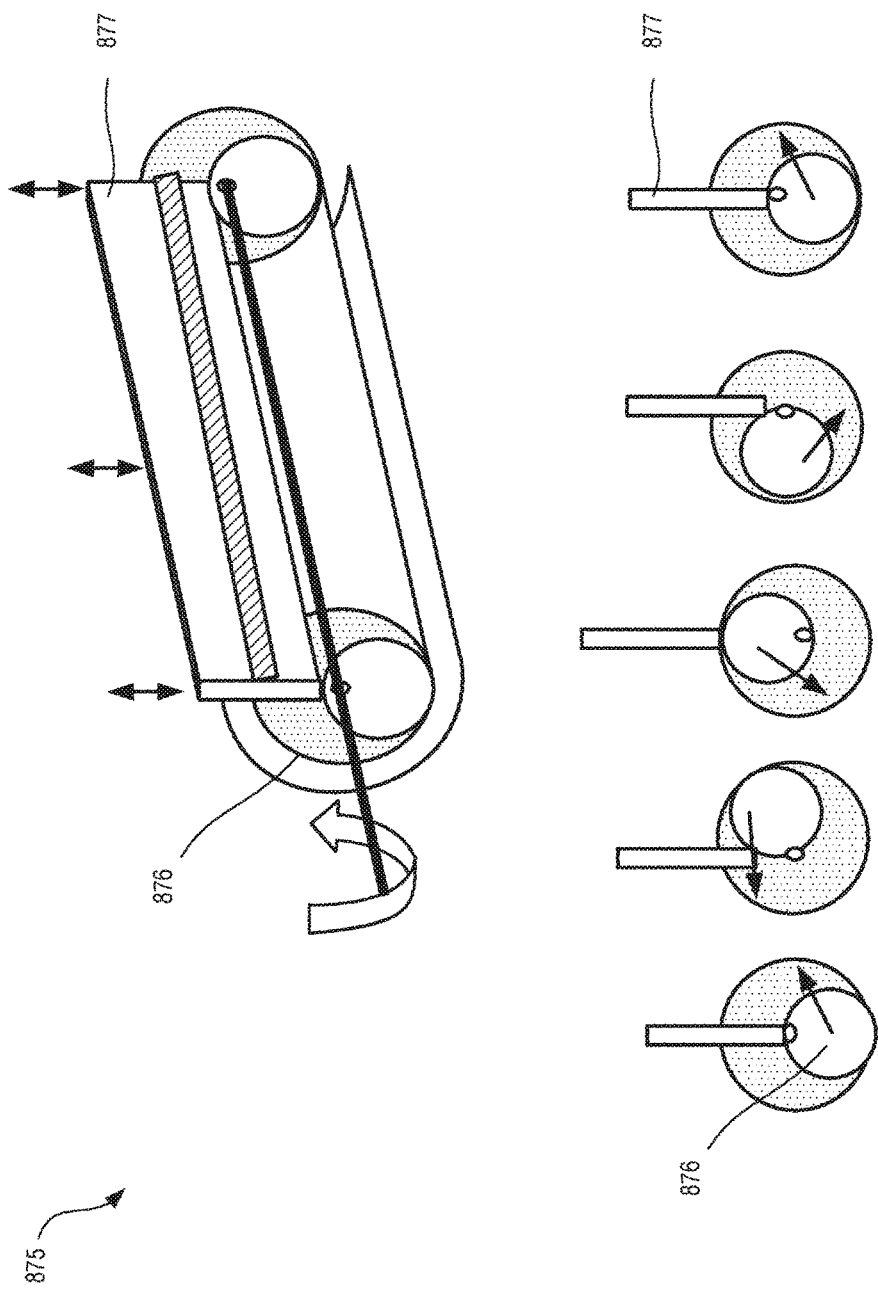
FIG. 18 illustrates a schematic view of an exemplary continuous longitudinal pump in accordance with various embodiments.

With reference to FIG. 18, in various embodiments, CLP 875 comprises a longitudinal pump in the true sense. CLP 875 may comprise an internal eccentric dowel 876. Dowel 876 pushes longitudinal sliding vane 877 up and down in such a manner so that vane 877 is always in contact with dowel 876, acting as a pressure seal. As dowel 876 rotates clockwise, saline solution in the basin is brought externally up to the top of the pump on the left side of vane 877 and drawn into the pump cavity behind rotating dowel 876. Dowel 876 continues to rotate and when dowel 876 reaches the top of its rotation, the saline solution has moved ahead of dowel 876. The saline solution is now pushed out of the pump cavity to the right of vane 877 as dowel 876 continues to rotate clockwise. The rotating cycle continues to draw in lower pressure basin saline solution and expel higher pressure saline solution in this manner.

With reference again to FIG. 2, continuous contacting tunnel desalination demonstrates various advantages over previous multi-tower designs. First, communication of air through inlet 116 and outlet 118 allows for even distribution for effective improved wall coverage and energy efficiency. In multi-tower designs, the hot humid air was directed around the brine fed location, which altered the parallel stream line flow. In multi-tower designs, returning air from the steam addition point entered the dew formation side obliquely, which may have reduced energy efficiency. The horizontal tunnel 102 of water treatment unit 100 can allow air exiting from the evaporation side 161 to remain parallel with air flow in the dew formation side 162, thus reducing the mal-alignment of the air flow patterns.

Second, wall wetting is improved by unlimited liquid flow rates as opposed to limited feed flow rate plus bottoms rates. In multi-tower designs, the wetting liquid for the heat transfer walls came from the feed flow rate and the desired brine rejection rate. In multi-tower designs, more liquid flows would reduce energy efficiency as the brine leaves the tower warm. In multi-tower designs, the net result is the production of warm brine instead of evaporation and condensation of distillate. In water treatment unit 100, the wall wetting liquids can leave and return to the basin liquid. This recycle effect does not negatively affect system efficiency. The CLP may increase the energy needs for pumping liquid, but the wall being wetter typically nets an improvement in system efficiency by increasing the wall effect wetting for improved wall coverage.

Third, water treatment unit 100 eliminates the feed heat exchanger required by multi-tower designs. In the multi-tower designs, a liquid feed heat exchanger is needed to increase the feed temperature prior to the feed arriving at the tower top where the temperature is high. If the feed arrives cold in multi-tower designs, more steam is required to bring the feed to the top high temperature. The result is a decrease in multi-tower energy efficiency. In contrast, water treatment unit 100 does not require a feed heat exchanger because, as the brine 112 enters the basin portion 104, it is continually pumped onto heat transfer wall 160, where the liquid heats up on the evaporative side 161 to the high temperature and cools down on the dew formation side 162 to the cooler exit temperature. The wall wetting CLP pump action can perform two jobs: wetting the wall, and heating and cooling the feed liquid.

Fourth, a disclosed water treatment unit 100 reduces hydraulic head pressures. The multi-tower design typically ranged in height from 5 feet to 9 feet. The pressure generated at the bottom of the towers may cause leaks to occur at the tower bottom, and such leaks may be severe enough to halt production for repair. Water treatment unit 100 may comprise a horizontal orientation and as such, minimizes hydraulic pressure and leak issues.

Fifth, water treatment unit 100 improves maintenance capabilities because horizontal tunnel 102 may comprise a low vertical silhouette. For example, in various embodiments, the horizontal tunnel 102 height can be 4 feet and the horizontal tunnel 102 length can be 8 feet. A low silhouette can allow ease of any maintenance needs that could arise. A low silhouette can reduce the negative effect of wind drag that has been observed with certain multi-tower designs.

Sixth, water treatment unit 100 may improve ease of manufacturing by utilizing commercially available materials. For example, heat transfer walls may be produced and/or purchased in 4 feet by 8 feet sheets. Water treatment unit 100 may allow for the immediate use of materials without need for custom design and/or manufacture.

Seventh, water treatment unit 100 may reduce cost of unit and assembly and can potentially increase gross margin. Water treatment unit 100 can incorporate commercially available heat transfer walls without modification. The sheets are standard at 4 feet by 8 feet and can be as long as 4 feet by 14 feet. The extra length does not affect the height so the low silhouette is preserved.

The environmental impact for exemplary systems is positive. Various exemplary systems treat TDS discharge waters comprising about 1500 ppm to about 5000 ppm to generate TDS distillate having less than about 10 ppm and concentrated brine 112 having about 200,000 ppm TDS of wet crystal solids. The distillate produced can be used to dilute the normal waste water treatment plant TDS discharge of about 1500 ppm. In various embodiments, zero environmental impact may occur by blending TDS distillate and brine 112 to form a waste water treatment plant TDS discharge of about 1500 ppm.

Various exemplary systems increase the ability of communities of varying sizes and financial resources to economically treat saline water to potable standards. The water treatment units of the present disclosure have successfully operated at the 50 gallon/day size and will operate at 10,000 gallon/day size. However, water treatment units embodying the present disclosure are contemplated for any volume and/or size. The units operate economically as their manufacturing costs are about $1000/gallon-day and operate at fuel costs ranging from $2.94 to $0.42/1000 gallons.

Various exemplary systems make desalting more efficient through promotion of dual-use facilities in which waste energy could be applied to desalting water. For example, methods of the present disclosure may use waste heat of related or unrelated facilities as an external heat source. Additionally, various exemplary systems ensure desalting technologies are environmentally friendly. The systems and methods disclosed herein use low levels of energy in standard operation. Also, no new electric generating stations need to be built as the electrical usage is low at less than 1.6 kWh/1000 gallons (67 kW for a 1 million gallon/day plant).

In various embodiments, solar collectors can be used in place of steam to generate hot water having a temperature of about 170° F. The hot water can contact vapor-carrying gas in the dewvaporation portion of a water treatment unit 100, thereby evaporating water into the vapor-carrying gas and eliminating the need to add steam to the system. The cost of a single glaze solar collector is about $10/sqft. Assuming an 8 hour solar day and 150 BTU/sqft-hr of collection, then 2100 sqft of collector would be required to produce 1000 gallons/day distillate at a thermal multiple effect factor of 3.3. The amortized water cost would be $6.36/1000 gallons. This cost is less than the cost of steam from natural gas which is about $20.85/1000 gallons.

In various embodiments, a liquid desiccant is used to enhance the energy reuse factor based on the ability of strong salt solutions to absorb moisture from air, thus drying the air and releasing the heat of vaporization. This heat can be released at higher temperatures than the original temperature of the air that was contacted by the desiccant and that heat can be reused to do an equal amount of water evaporation into another air stream.

Figure 19:
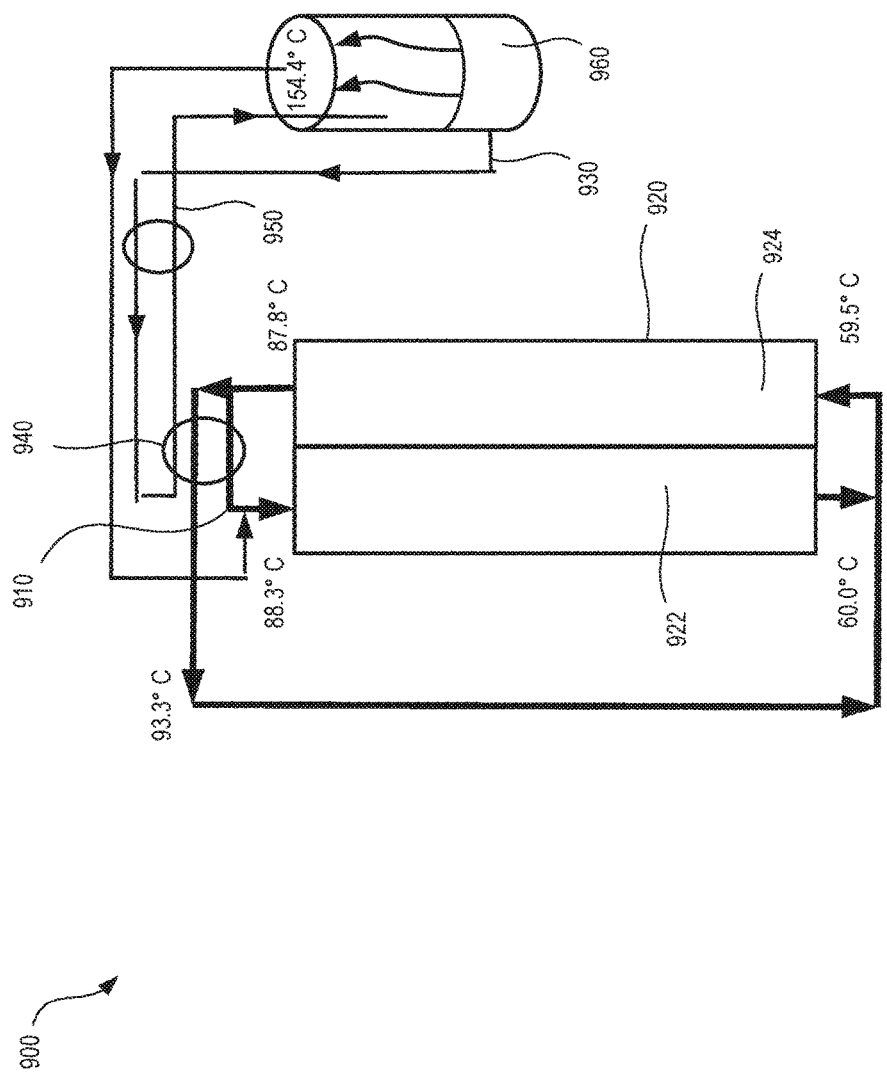
FIG. 19 illustrates a schematic view of a water treatment unit in accordance with various embodiments.

With reference now to the water treatment system 900 of FIG. 19, in various embodiments, a slip stream of hot humid air 910 at the top of a tower 920 is contacted by a strong liquid desiccant stream 930 in a desiccant contact heat exchanger 940. The remaining hot humid air may be further humidified in desiccant contact heat exchanger 940 by evaporation of feed water to vapor by the energy furnished by the desiccant air drying. The now hotter humid air stream may return to a dew formation chamber 922 while the dried air may go to the bottom of an evaporation chamber 924. The desiccant stream 950, now diluted by the water vapor picked up in desiccant contact heat exchanger 940, may return to boiler 960 for regeneration. The steam released in boiler 960 from the boiling desiccant liquid may be sent to the top of dew formation chamber 922 to further increase the temperature and humidity of the returning hot humid air. In this manner the boiling energy may be essentially halved. The energy needs may be reduced to half by this technique compared to the standard operation of dewvaporation towers.

Figure 20:
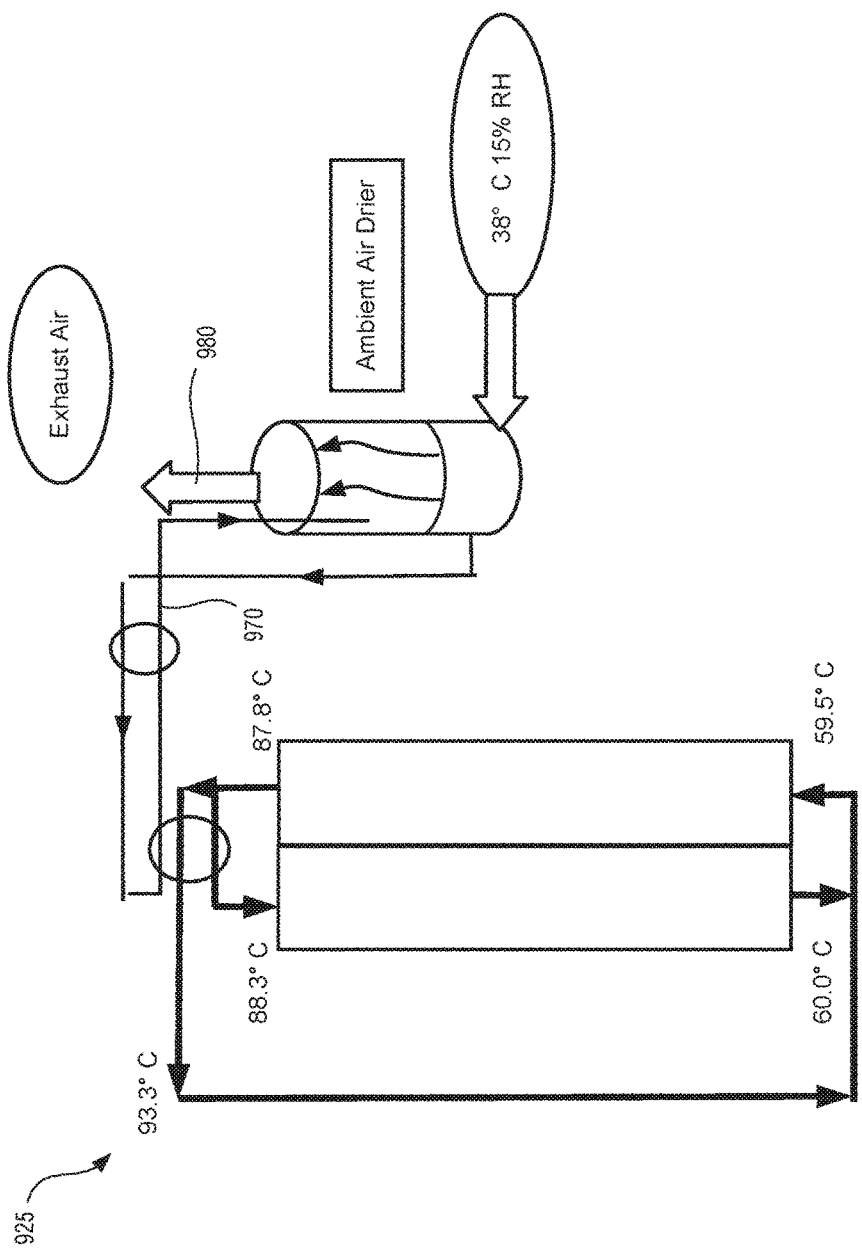
FIG. 20 illustrates a schematic view of a water treatment unit in accordance with various embodiments.

In various embodiments and with reference to the water treatment system 925 of FIG. 20, if dry air is available, then the desiccant is regenerated by contacting the wet desiccant 970 with the dry air 980 for water evaporation. In this technique of drying liquid desiccants to the original salt concentrations, dry air may become more humid as the solution loses water. No energy is required other than a fan motor aided by natural wind. The energy needs may be reduced to about 2.5 kWh electricity/1000 gallons and heat to about 80,000 BTU/1000 gallons. Less electricity and heat may result due to the action of wind and release of the desiccant dilution heat of solution.

Areas of the world where sea water exists with nearby desert dry conditions are natural areas that could be advantaged for drying of desiccant liquids. In these areas where water is needed most when the air is driest, the air regeneration technique works very well. The desiccant regeneration technique also works in environments more humid than desert regions. In various environments, the treated humid air is not dried out as thoroughly in areas of high humidity, resulting in more water being evaporated to the environment by the desiccant regeneration. Therefore, humid areas can still utilize this ambient air desiccant drying technique.

If the environment air is very humid, the ambient air regeneration technique can work if a solar collector is used to heat water, that can be stored, to heat humid air to a temperature to make that air about 20% relative humidity. For example, in cities with temperatures of about 80° F. and 80% relative humidity, air could be heated to about 140° F. with about 150° F. water to a condition of about 20% relative humidity. Regions with cooler temperatures but high humid regions could use the desiccant ambient air regeneration by solar heating air to about 125° F. with about 135° F. hot water. These low water temperatures could be achieved in inexpensive single glazed flat plate solar collectors.

Figure 21:
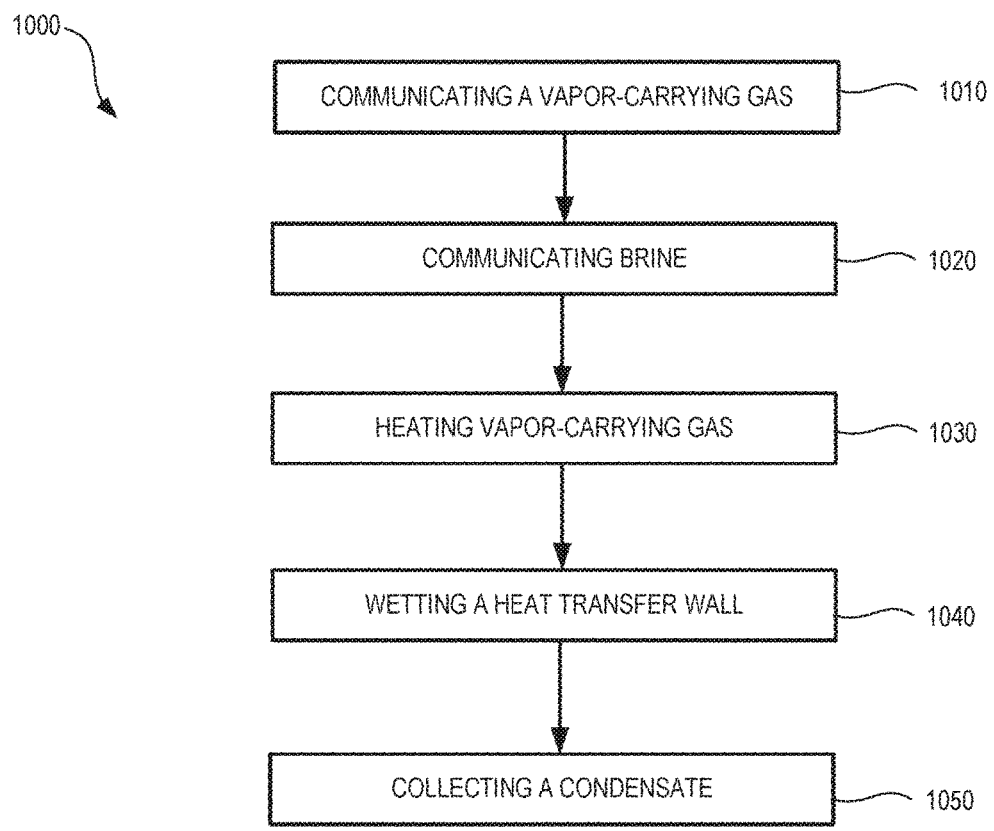
FIG. 21 illustrates a method of using a water treatment unit in accordance with various embodiments.

In various embodiments, the present disclosure provides methods for treating a liquid. With reference now to FIGS. 1 and 21, a method 1000 comprises communicating a vapor-carrying gas 114 through a water treatment unit 100 (step 1010) and communicating brine 112 through a water treatment unit 100 (step 1020). Method 1000 further comprises heating vapor-carrying gas 114 in water treatment unit 100 (step 1030), wetting a heat transfer wall 160 with brine 112 (step 1040), and collecting a condensate 130 (step 1050).

Figure 22:
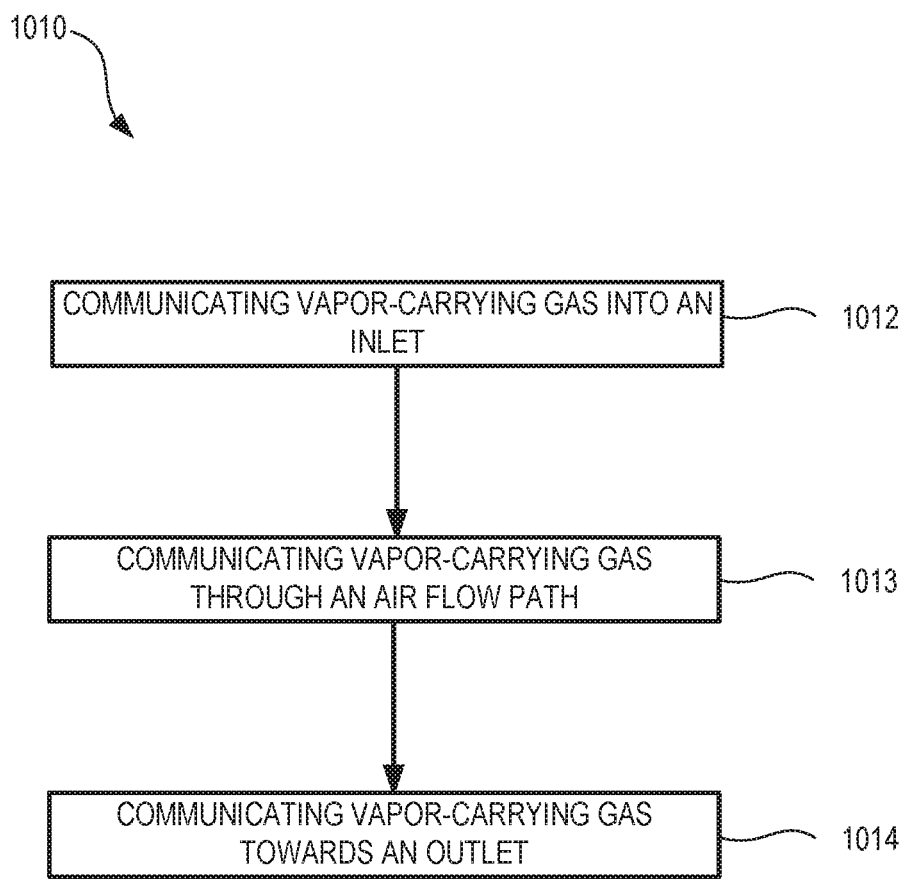
FIG. 22 illustrates portions of a method of using a water treatment unit in accordance with various embodiments.
Figure 23:
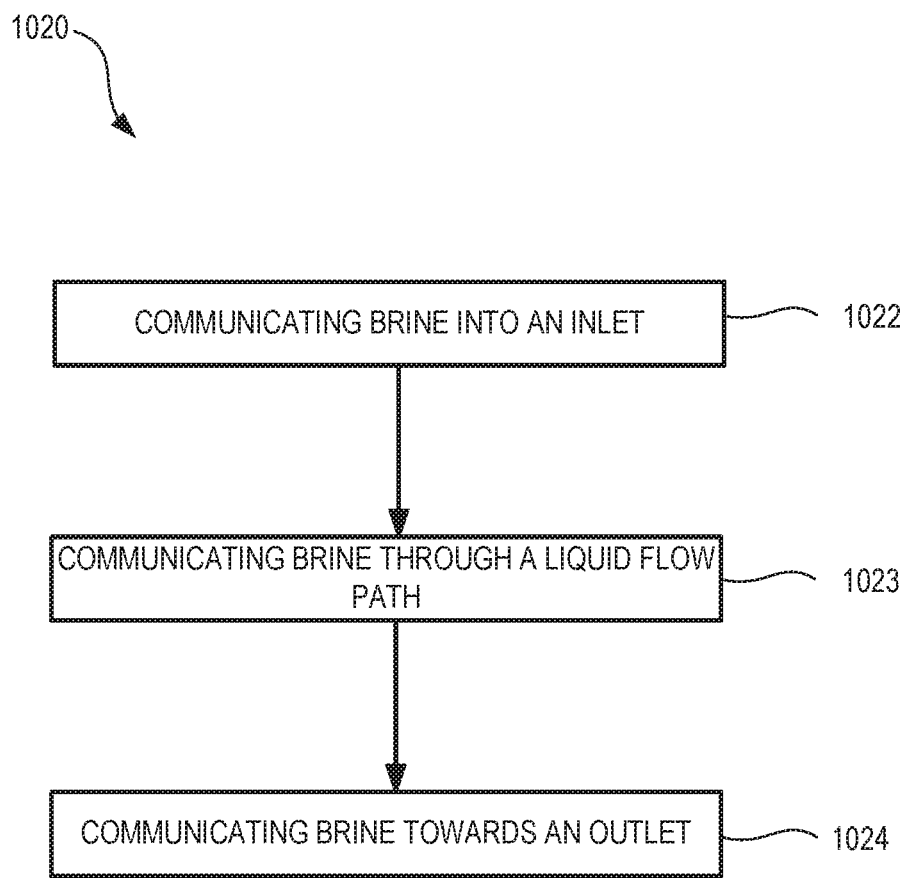
FIG. 23 illustrates portions of a method of using a water treatment unit in accordance with various embodiments.

In various embodiments, and with reference now to FIG. 22, the communicating a vapor-carrying gas 114 (step 1010) comprises communicating vapor-carrying gas 114 into an inlet 116 of water treatment unit 100 (step 1012), through an air flow path (step 1013), and towards an outlet 118 of water treatment unit 100 (step 1014). In various embodiments, and with reference now to FIG. 23, the communicating the brine 112 (step 1020) comprises communicating brine 112 into inlet 116 of water treatment unit 100 (step 1022), through a liquid flow path (step 1023), and towards outlet 118 of water treatment unit 100 (step 1024).

Various exemplary embodiments disclosed herein utilize a continuous longitudinal pump or pumps. It will be appreciated that in some embodiments, a set of stationary pumps may be utilized for wall wetting and thus be considered a "continuous longitudinal pump". For example, a set of ten stationary pumps (5 on one side and 5 on the other side) may be utilized for wall wetting; moreover, any suitable number of stationary pumps may be utilized.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A water treatment unit, comprising:
a horizontal tunnel comprising an inlet, an outlet, and a basin portion disposed below a dewvaporation portion;
a center divider disposed in the basin portion so as to create a liquid flow path extending from the inlet to the outlet;
a heat transfer wall disposed above the center divider so as to create an air flow path substantially parallel to the liquid flow path and extending from the inlet to the outlet, wherein the heat transfer wall comprises two substantially parallel planes and a plurality of horizontal chambers disposed therebetween;
a first continuous longitudinal pump disposed in the horizontal tunnel and configured to wet the heat transfer wall with liquid disposed in the basin portion; and
a heating mechanism configured to increase the temperature of air disposed between the inlet and the outlet.

2. The water treatment unit of claim 1, wherein the heat transfer wall is disposed at an angle.

3. The water treatment unit of claim 2, further comprising a second continuous longitudinal pump,
wherein the first continuous longitudinal pump is disposed on an evaporation side of the heat transfer wall, and
wherein the second continuous longitudinal pump is disposed on a dew formation side of the heat transfer wall.

4. The water treatment unit of claim 3, further comprising open cell foam strips.

5. The water treatment unit of claim 3, further comprising a condensate channel coupled to the heat transfer wall and configured to separate condensate from other portions of the desalination unit.

6. The water treatment unit of claim 3, wherein the heat transfer wall further comprises gauze disposed on an outer surface of the heat transfer wall.

7. The water treatment unit of claim 3, wherein the heat transfer wall further comprises a gauze wall spacer.

8. The water treatment unit of claim 3, further comprising a vane insert coupled to the heat transfer wall.

9. The water treatment unit of claim 3, further comprising a sponge coupled to a top edge of the heat transfer wall.

10. The water treatment unit of claim 3, further comprising at least one of an air inlet plenum box and an air outlet plenum box.

11. The water treatment unit of claim 3, wherein the heating mechanism comprises at least one of steam, a solar collector, or a desiccant heat pump.

12. The water treatment unit of claim 3, wherein at least one of the first continuous longitudinal pump and the second continuous longitudinal pump comprises at least one of a rotating pipe assembly, a stationary single pump with moving ports, a mobile pump and port assembly, a pulley design pump and port assembly, a lift tray assembly, a teeter-totter assembly, an oscillating chamber pump assembly, or a rotating pump with sliding longitudinal vane.

13. The water treatment unit of claim 2, wherein the plurality of horizontal chambers is configured to collect condensate.

14. The water treatment chamber of claim 13, further comprising a condensate channel coupled to at least one of the plurality of horizontal chambers.

15. A water treatment unit, comprising:
a horizontal tunnel comprising an inlet, an outlet, and a basin portion disposed below a dewvaporation portion;
a center divider disposed in the basin portion so as to create a liquid flow path extending from the inlet to the outlet;
a heat transfer wall disposed above the center divider so as to create an air flow path substantially parallel to the liquid flow path and extending from the inlet to the outlet, wherein the heat transfer wall comprises two substantially parallel planes and a plurality of horizontal chambers disposed therebetween;
a heating mechanism configured to increase the temperature of air disposed between the inlet and the outlet; and
a means for wetting the heat transfer wall.

16. The water treatment unit of claim 15, wherein the heat transfer wall is disposed at an angle.

17. The water treatment unit of claim 16, wherein the plurality of horizontal chambers is configured to collect condensate.

18. The water treatment unit of claim 17, wherein the means for wetting the heat transfer wall is configured to wet an evaporation side of the heat transfer wall and a dew formation side of the heat transfer wall.

19. A method for treating a liquid, the method comprising:
communicating air through a water treatment unit;
communicating a brine through a water treatment unit;
heating the air in the water treatment unit;
wetting a heat transfer wall of the water treatment unit with the brine; and
collecting a condensate,
wherein the water treatment unit comprises:
a horizontal tunnel comprising liquid inlet, liquid outlet, air inlet, air outlet, and a basin portion disposed below a dewvaporation portion;
a center divider disposed in the basin portion so as to create liquid flow path extending from the liquid inlet to the liquid outlet
the heat transfer wall disposed above the center divider so as to create air flow path substantially parallel to the liquid flow path and extending from the air inlet to the air outlet, the heat transfer wall comprising two substantially parallel planes and a plurality of horizontal chambers disposed therebetween, wherein the heat transfer wall is disposed at an angle;
a first continuous longitudinal pump disposed in the horizontal tunnel and configured to wet the heat transfer wall with liquid disposed in the basin portion; and
a heating mechanism configured to increase the temperature of air disposed between the air inlet and the air outlet.

20. The method of claim 19, wherein the condensate is formed in the plurality of horizontal chambers.

* * * * *